US006584480B1

(12) United States Patent
Ferrel et al.

(10) Patent No.: US 6,584,480 B1
(45) Date of Patent: Jun. 24, 2003

(54) STRUCTURED DOCUMENTS IN A PUBLISHING SYSTEM

(75) Inventors: Patrick J. Ferrel, Seattle, WA (US);
Robert F. Meyer, Redmond, WA (US);
Stephen J. Millet, Seattle, WA (US);
John P. Shewchuk, Seattle, WA (US);
Walter W. Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 113 days.

(21) Appl. No.: 09/698,067

(22) Filed: Oct. 30, 2000

Related U.S. Application Data

(63) Continuation of application No. 08/503,307, filed on Jul. 17, 1995, now Pat. No. 6,230,173.

(51) Int. Cl.[7] .......................... G06F 17/00; G06F 17/24
(52) U.S. Cl. ..................... 707/513; 707/514; 707/501.1
(58) Field of Search ................................ 707/513, 514, 707/501.1

(56) References Cited

U.S. PATENT DOCUMENTS

| 4,710,885 A | | 12/1987 | Litteken | ..................... 707/513 |
|---|---|---|---|---|
| 4,969,093 A | * | 11/1990 | Barker et al. | ................. 707/513 |
| 5,347,632 A | | 9/1994 | Filepp et al. | ................. 709/702 |
| 5,359,673 A | * | 10/1994 | de La Beaujardiere | ..... 382/229 |
| 5,475,805 A | * | 12/1995 | Murata | ........................ 707/513 |
| 5,557,722 A | * | 9/1996 | DeRose et al. | .............. 345/776 |

OTHER PUBLICATIONS

Duncan, Ray, "Power Programming: An HTML Primer," PC Magazine, Jun. 13, 1995, pp. 261–270.

Sperberg–McQueen et al., "HTML to the Max: a Manifesto for Adding SGML Intelligence to the World–Wide Web," http://www.ncsa.uiuc.edu/SDG/IT94/Proceedings/Autools/sperberg–McQueen/sperberg.html., Oct. 1994.

* cited by examiner

Primary Examiner—Joseph H. Feild
Assistant Examiner—Rachna Singh
(74) Attorney, Agent, or Firm—Banner & Witcoff, Ltd.

(57) ABSTRACT

An authoring environment for producing content for an on-line system is described. This environment includes a story editor which can save files in a Multimedia Document Format (MDF) file. A MDF file is an OLE storage wherein one storage object holds text of the content in a Multimedia Publishing Markup Language. Other parts of the MDF file include storages for holding content search terms and storages for embedded objects.

29 Claims, 19 Drawing Sheets

STRUCTURED DOCUMENTS IN A PUBLISHING SYSTEM

CROSS-REFERENCE TO RELATED APPLICATION

The present application is a continuation of U.S. patent application Ser. No. 08/503,307, filed Jul. 17, 1995, entitled "STRUCTURED DOCUMENTS IN A PUBLISHING SYSTEM", now U.S. Pat. No. 6,230,173, issued May 8, 2001, to Patrick J. Ferrel et al.

BACKGROUND OF THE INVENTION

1. Field of the Invention

The present invention relates to electronic publishing systems and, more specifically, to an authoring system for creating structured documents in an on-line publishing system.

2. Description of the Related Technology

Many different systems exist for publishing documents on a computer system. These systems are used to, for example, create newsletters or brochures to promote a particular company. In addition, publications can be used to disseminate information to a variety of customers. A number of programs exist for allowing a user to design complicated layouts for a particular application. Well-known programs such as Microsoft Publisher®, Ventura Publisher®, PageMaker®, and PrintShop® help a user to produce attractive newsletters and brochures.

These publication systems let the user define particular regions of every page for a specific purpose. For example, the user can place a graphic frame that runs along the top of the page to hold a particular image. Such an image may include the title of the newsletter or another related aspect of the newsletter. In a similar way, the user may define other areas of the first page to include one or more text frames for holding text-based information such as the words from particular story. The user designs the text frame to have certain properties, such as height, width, background color, foreground color and other such properties so that the text becomes attractively formatted for the customer. In addition, the user can format the text information within the text frame to have desired font and paragraph characteristics. For example, the user can highlight the characters within the text frame and define that font to be, for example, bold-faced. The user can also choose to only apply a character format to specific words or paragraphs within a text frame.

Some of these publication programs use a Microsoft Object Linking and Embedding (OLE) architecture to store their documents. A major feature of OLE is interoperability, the basis for integration between applications. This integration brings with it the need to have multiple applications write information to the same file on the underlying file system. OLE defines a model called OLE Structured Storage for treating a single file system entity as a structured collection of two types of objects: storages and streams. These objects act like directories and files, respectively. The OLE Structured Storage model generally implements these objects; applications rarely, if ever, need to implement them. These objects, like all others in OLE, implement interfaces: IStream for stream objects, IStorage for storage objects.

A stream object is the conceptual equivalent of a single disk file. Streams are the basic file system component in which data lives; each stream has access rights and a single seek pointer. Through its IStream interface, a stream can be told to read, write, seek, and perform a few other operations on its underlying data. Streams are named by using a text string; they can contain any internal structure because they are simply a flat stream of bytes. In addition, the functions in the IStream interface map nearly one-to-one with standard file-handle-based functions such as those in the ANSI C/C++ run-time library.

A storage object is the conceptual equivalent of a directory. Each storage, like a directory, can contain any number of substorages (subdirectories) and any number of streams (files). Furthermore, each storage has its own access rights. The IStorage interface describes the capabilities of a storage object, such as enumerate elements (dir), move, copy, rename, create, and destroy. A storage object itself cannot store application-defined data except that it implicitly stores the names of the elements (storages and streams) contained within it.

The OLE Structured Storage technology solves problems associated with previous flat file systems through the extra level of indirection of a file system within a file. With OLE, a particular application can create a structured hierarchy where the root file itself has many substorages. Each substorage can have substorages within it, and so on.

This structure solves the problem of expanding information in one of the objects: The object itself expands the streams in its control, and the implementation of storage determines where to store all the information in the stream.

In this sort of storage scheme, the objects that manage the content always have direct incremental access to their piece of storage. That is, when the object needs to store its data, it writes it directly into its subfiles without having to involve the main application. The object can, if it wants to, write incremental changes to that storage, thus leading to much better performance.

If the user wants to make changes to that information later on, the object can then incrementally read as little information as necessary instead of requiring the application to read all the information into memory first. Incremental access, a feature that has traditionally been very hard to implement in applications, is now the default mode of operation.

Other categories of publication systems include software for electronically publishing stories across on-line networks such as CompuServe, America On-Line, or the Internet. Most of these systems create and display stories that are formatted in a Standard Generalized Markup Language (SGML) or Hypertext Markup Language (HTML). Both the HTML and SGML are standards for tagging text in documents to be displayed in an on-line network. Documents that are formatted in HTML or SGML can be viewed by several widely distributed browsers such as Mosaic and NetScape for the Internet. These browser programs read SGML and HTML tagged documents and display them with proper formatting.

Several programs exist for producing documents that are tagged in either the SGML and HTML format. Programs such as Interleaf's WorldView 2 allow a user to create an SGML document with, for instance, bold-face text and hyperlinks to other documents. Once a document has been saved in an SGML format, it can be read by either the Mosaic or NetScape browser. Unfortunately, all of the formatting commands for text or graphics in an SGML or HTML document are embedded within the document. The Mosaic or NetScape browsers do not reformat these tagged documents, but rather only display the commands embedded in the SGML or HTML documents to a user. For this reason, the designers that produce the SGML and HTML documents must add formatting commands to every new document. In addition, there is little flexibility to change the document's formatting once the tagged document has been produced. Therefore, the process of creating documents for display using SGML or HTML is very inefficient for the document designer.

Other commercially available software programs for producing on-line publications are available in the marketplace. One type of electronic publisher that generates its own specific format of text while retaining the specific layout of the document is the Adobe Acrobat™ software package. Acrobat™ reads and stores documents in a specialized format known as the Portable Document Format (PDF) for use on the Internet. Other electronic publishing programs are produced by Interleaf, Inc. (Waltham, Mass.), Farallon Computing (Alameda, Calif.) and Common Ground Software (Belmont, Calif.).

In addition, a converter has been written by Charlesview (Boston, Mass.) to convert Microsoft Word® documents into HTML text. This converter works by mapping Word styles to HTML tags, and then produces a text document. However, since these documents are converted into a text form so they can be read by well known browsers, they do not include embedded objects. In addition, HTML text documents do not have any associated keywords which would allow them to be found quickly across a large on-line system.

Another on-line information system is described in U.S. Pat. No. 5,347,632 by Filepp et al. This patent discusses an interactive computer system network which enables a user to display news information and perform transactional services through a personal computer. However, in the Filepp system the news information is integrated into display regions.

The invention described in U.S. Pat. No. 5,347,632 includes procedures for formulating objects that have been specially structured to include display data, control data and program instructions. Unfortunately, this system does not provide a separation of the content being displayed from the design.

Therefore a need exists for an on-line system which provides separation of design from content. Moreover, a need exists for an authoring system to be used in an on-line network to provide content providers with increased flexibility for presenting their content to customers.

SUMMARY OF THE INVENTION

The present invention relates to a new authoring system for creating on-line stories. The preferred embodiment of the environment uses an enhanced version of Microsoft Word® to create Multimedia Document Files (MDF). These multimedia files are then used to provide content for displayed on-line titles as discussed below for a Multimedia Publishing System (MPS).

The enhanced Microsoft Word® includes a pair of converters to translate the Rich Text Format (RTF) input/output of Word® to a Multimedia Document File format. In addition, a Word template is included to help the author produce documents with valid embedded codes. A hypertext link embedding tool and a property editor for assigning find properties to the document are also included. These will be discussed below in more detail.

One object in the MDF file storage holds text of the story that is tagged in a newly designed markup language termed herein as the Multimedia Publishing Markup Language (MPML). MPML is a version of the HTML 2.0 with additional extensions for supporting more detailed tagging of structure as well as embedded OLE objects.

In addition to adding MDF content to a project by authoring in Word®, the present invention also includes programs for converting existing HTML documents to a MPML when added to a project. These concepts will be explained in more detail below.

One embodiment of the present invention is a method of publishing structured documents in a computer network comprising publisher, server and customer computers comprising creating tagged content, storing a plurality of tagged objects representative of the tagged content in a document in the publisher computer, adding at least one non-tagged object to the document, transferring the document to the server computer, and receiving, at the customer computer, from the server computer the non-tagged objects of the document independent of the tagged objects.

Another aspect of the present invention is a method of publishing structured documents in an electronic publication system, comprising inserting a plurality of text portions indicative of a story object into a document, tagging each text portion of the story object with a tag, inserting an embedded object into the story object, storing the tagged text portions into a first object storage of the story object, storing the embedded object into a second object storage of the story object, and displaying selected ones of the text portions and the embedded object, the selection dependent upon the tags.

Yet another aspect of the present invention is a structured document in an electronic publication system, comprising a storage container having a root storage, a find properties object stream referenced by the root storage, a markup language object storage referenced by the root storage container, and an embedded object storage referenced by the root storage container.

Still another aspect of the present invention is a method for efficiently transmitting tagged content to a computer in an on-line publishing system, comprising creating a tagged document on a host computer, parsing the tagged document into a parse tree comprising a plurality of objects, and transmitting the objects to a second computer.

DETAILED DESCRIPTION OF THE PREFERRED EMBODIMENTS

Figure 1:
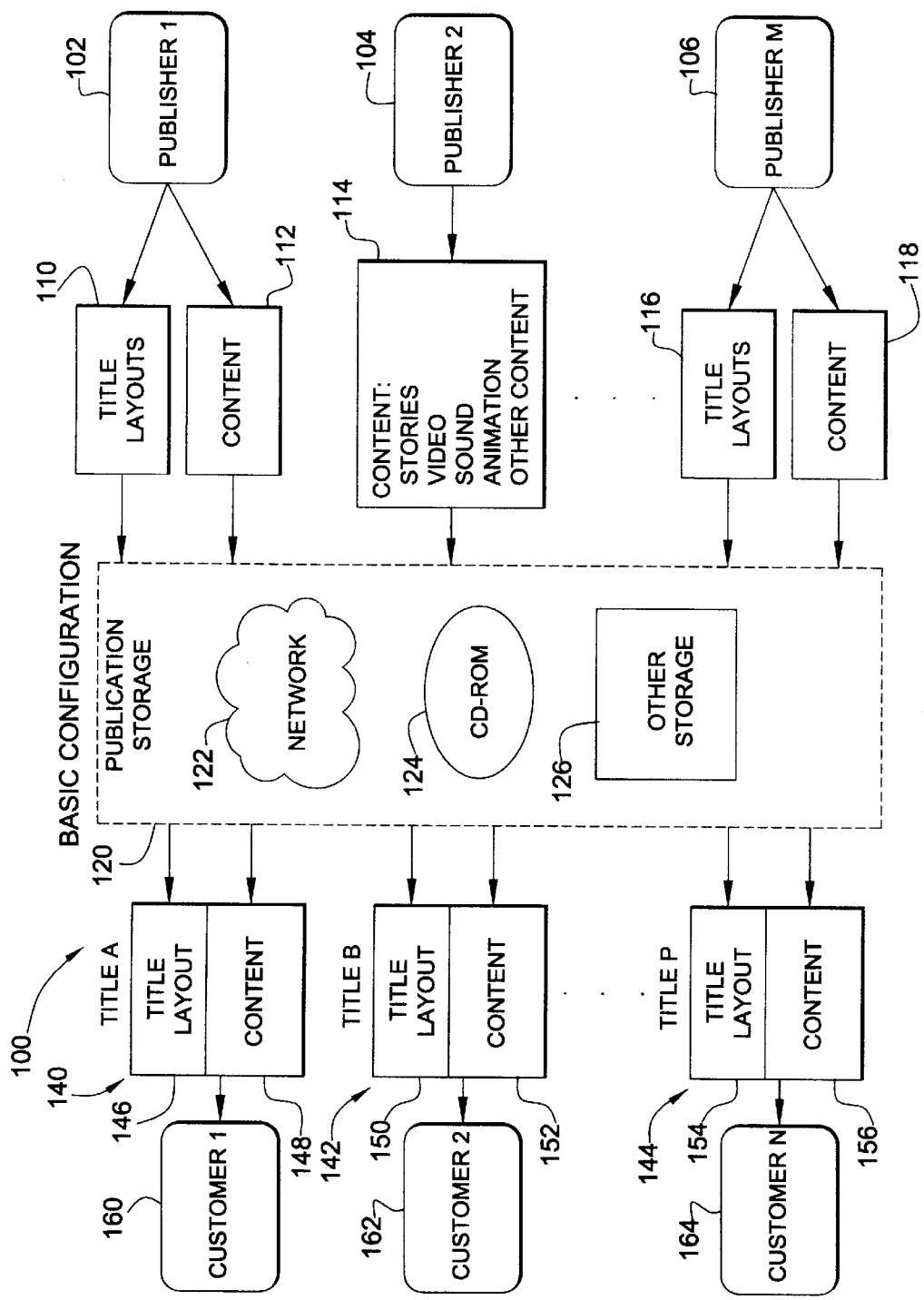
FIG. 1 is block diagram of the basic system configuration of the multimedia publishing system (MPS), which is presently preferred underlying architecture for the present invention.

Reference is now made to the drawings wherein like numerals refer to like parts throughout. For convenience, the following description will be organized into the following seven principle sections: Acronyms, Advantages of the Multimedia Publication System, Multimedia Publishing System Overview, Authoring Overview, Multimedia Document Format File Structure, Using Multimedia Documents in an On-line System, Summary.

The discussion in the first three sections is general background of the preferred Multimedia Publication System (MPS). The remaining sections focus on the preferred implementation of structured documents within the MPS.

I. ACRONYMS

The following list of acronyms is provided as a reference in reading the remaining sections.
AVI—Advanced Video Imaging.
BBS—Bulletin Board System.
MPML—Multimedia Publishing Markup Language
CF—Component Forms
COS—Caching Object Store
DBM—Database Management System
DLL—Dynamic-link Library
GUID—Globally Unique Identifier
HTML—HyperText Markup Language
ICP—Independent Content Provider
IP—Information Provider
LAN—Local Area Network
MDF—Multimedia Document Format
MP—Multimedia Publishing
MPC—Microsoft Network Procedure Call
MPS—Multimedia Publishing System
MFC—Microsoft Foundation Class
MSN—Microsoft Network
OCX—OLE Control
OFS—Object File System
OLE—Object Linking and Embedding
PDA—Personal Digital Assistant
RPC—Remote Procedure Call
RTF—Rich Text Format
SGML—Standard Generalized Markup Language
VBA—Visual Basic for Applications
WAN—Wide Area Network
WWW—World-Wide Web

II. ADVANTAGES OF THE MULTIMEDIA PUBLICATION SYSTEM

The present invention can perhaps provide the most benefit by using an on-line network. Therefore, this and the following sections present background information on a preferred on-line publication system which is a foundation upon which the present invention can reside.

To enable a new generation of on-line, multimedia applications, an end-to-end system has been invented for developing and using applications and services. The system, called the Multimedia Publishing System (MPS or MP system), preferably uses the Microsoft Network. As an open, turnkey system, MPS includes components for design, authoring, distribution, viewing, search, personalization, and billing of on-line services and multimedia applications. The MP system allows content providers to offer rich, interactive multimedia applications and services, providing users a compelling and exciting on-line experience. The MP system provides the key to overcoming the previously described hurdles facing the on-line industry.

The Microsoft Network removes the primary barriers to on-line service use. These barriers include cost, difficult user interfaces and lack of inertia. Access to The Microsoft Network is provided by Windows 95, the most recent version of the Microsoft Windows operating system thereby making it accessible to millions of customers. The Microsoft Network is designed to make accessing electronic information easy and inexpensive for any user of Windows 95.

In the MP system, Independent Content Providers (ICPs), also known as publishers, supply the system with stories, publications, newspapers, sounds, graphics movies and much more. The MP system is designed to take projects (e.g. stories, publications and newsletters) produced by the publishers and make them accessible to millions of users on the Microsoft Network. Thus, the basic components of the MP system are a project designer component, a public distribution site, and a viewer component. These components of the MP system are described in detail below.

One unique concept that permeates the MP system is the clean separation of content and design. In this context, content is defined as the actual data that is to be displayed to the user. The design of a project is how that information gets displayed to the user (e.g., its format on the computer screen). An illustrative example would be an electronic newspaper, wherein the content is the text and graphics of the stories, while the design is the layout and style of that data. The design of the electronic newspaper is what makes it look like a newspaper on a computer monitor, whereas the content is the data that makes up the designed screens.

In the MP system, the content and the design are stored as separate objects in the public distribution site so that many different pieces of content can be viewed with the same appearance. An object can be defined as a discrete data item or data structure which can be stored in persistent storage or in memory. The object may include computer instructions for manipulating data. Once a designer using the project designer component at the publisher site has created a particular page layout that is attractive, many pieces of content can be viewed from within that layout because of the separation of content from design in the MP system. The system keeps track of links between a piece of content and its associated page layout, but does not actually format the data in the content with a particular style. This is one tremendous advantage that the MP system has over other on-line publishing systems such as Mosaic or Netscape.

As will be discussed in more detail below, the designer creates projects with design and content information for a particular publisher. Continuing the example from above, a project could correspond to an entity that owned a series of newspapers and other media businesses. Within each project, one or more titles would correspond to the actual newspaper. Each title has one or more sections, and can be thought of as similar to the sections in a standard, printed daily newspaper or other periodical such as a magazine.

Within each section are pages that define the information that is displayed to a single screen on the customer's computer visual display. When viewing a particular title, the customer will normally look at only one page of information at a time. On each page are controls which contain instructions for gathering, formatting and displaying the linked content onto the page. When a customer looks at information on a page that is provided by a publisher, the customer is really looking at content that has been formatted within pre-defined control regions on the page.

One important facet of this invention is the concept of viewing the same content objects in many different ways. As discussed above, content objects are viewed after being formatted by a particular linked control. The control knows how to format a particular piece of content by looking at the style that has been defined for that content by the designer and then comparing that style to a linked style sheet. Because each control on a page can have a different associated style sheet, different controls on the same page can each display the same linked content in varying formats. In one control, the title might be displayed using a 14 point font and bold emphasis, whereas the same piece of content in a different control on the page can be displayed in a 12 point font and italic emphasis. The ability of each control on a page to have its own associated style sheet is a powerful tool for the designer to use to format attractive content on a page.

While other software has used the overall concept of using style sheets to format marked text into a particular style, no one has linked style sheets to controls on pages, wherein the control itself does not contain data, but is only associated with data objects. Unlike prior publishing systems, content (such as text or graphics) in the MP system is never reformatted into the marked style. The content is only displayed to the user in the chosen style. Therefore, should the designer choose to change a particular style, only the style sheet property of that style needs to be altered. The next time that the content is displayed using the altered style sheet, the content will be displayed with the properties of the new style. Other advantages and benefits of the MP system are discussed in detail below.

To provide more detail on the advantages of the MP system, the following section presents an overview of the Multimedia Publishing system.

III. MULTIMEDIA PUBLISHING SYSTEM OVERVIEW

This section presents an overview of the configuration and major components of the preferred Multimedia Publication System. Beginning with a description of the important concept of separating design and content, this section continues by discussing the major components and configuration of the MP system. In addition, a description of the container hierarchy is discussed in conjunction with FIGS. 1–4.

The objects utilized by the MP System include a project; title; content folder and, optionally, subfolder; section and, optionally, subsection; window; page; control; style sheet; and various content objects (such as stories, images, audio, so forth). These objects will be explained in more detail below in reference to FIGS. 1–7. It is important to realize that these objects need to be stored in a non-volatile computer memory such as a hard disk drive.

Figure 2:
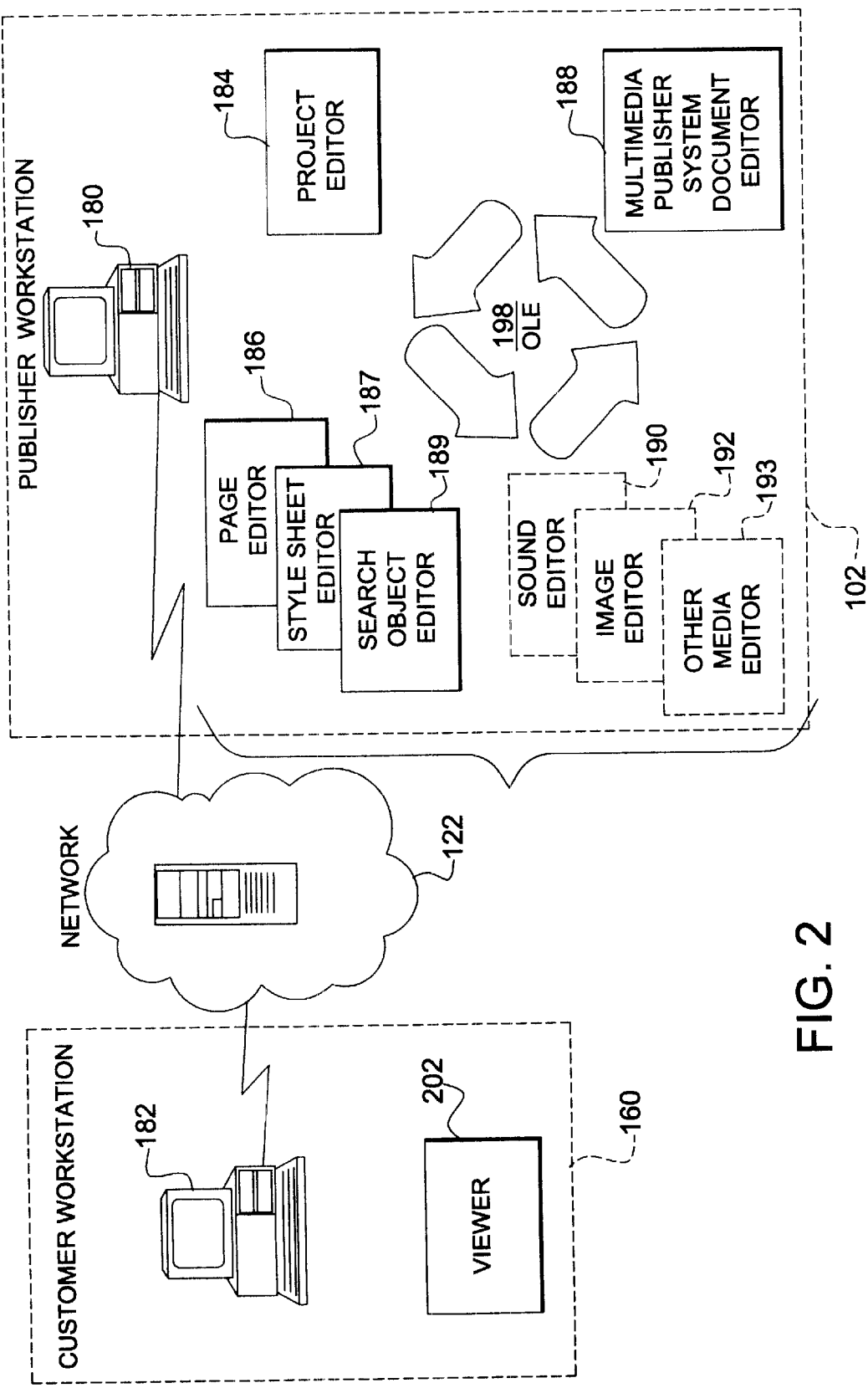
FIG. 2 is a diagram of the major system components of the MPS shown in FIG. 1.

The natural way of storing related and ordered objects is in a data structure, such as an acyclic graph. The presently preferred way of storing the MP system objects is called a caching object store (COS). The concept of a COS and how it operates to organize objects within an OLE environment is known in the art. See, for example, *Inside OLE* 2 by Kraig Brockschmidt (Microsoft Press). In the presently preferred MPS, each title corresponds to a COS. There is least one COS at the publisher workstation and in each MPS server at the publication storage and distribution center (FIG. 2). Each customer workstation also has a COS so that the customer can store and retrieve MP system objects when assembling content into controls on pages.

A title may be broadly defined to encompass a publication (e.g., newspaper), service (e.g., stock quotations) or application (e.g., multimedia encyclopedia). When a title is viewed, the viewer opens a title file which represents the title. This title file is a COS file. Typically in the on-line scenario, this would be a skeleton title. A skeleton title is a COS file which contains only a root moniker and no actual objects. A moniker is an object used in the implementation of the COS and contains identification and status information about COS objects.

A superCOS is a COS file which contains more than one COS. For example a superCOS at the customer workstation is used to cache objects which have been remotely retrieved from the host data center. As long as these cached objects are not out of date or flushed, the viewer will be able to quickly provide that object the next time it is requested rather than retrieving it from the data center again. This gives the MP system a tremendous speed advantage over other on-line systems.

Figure 5:
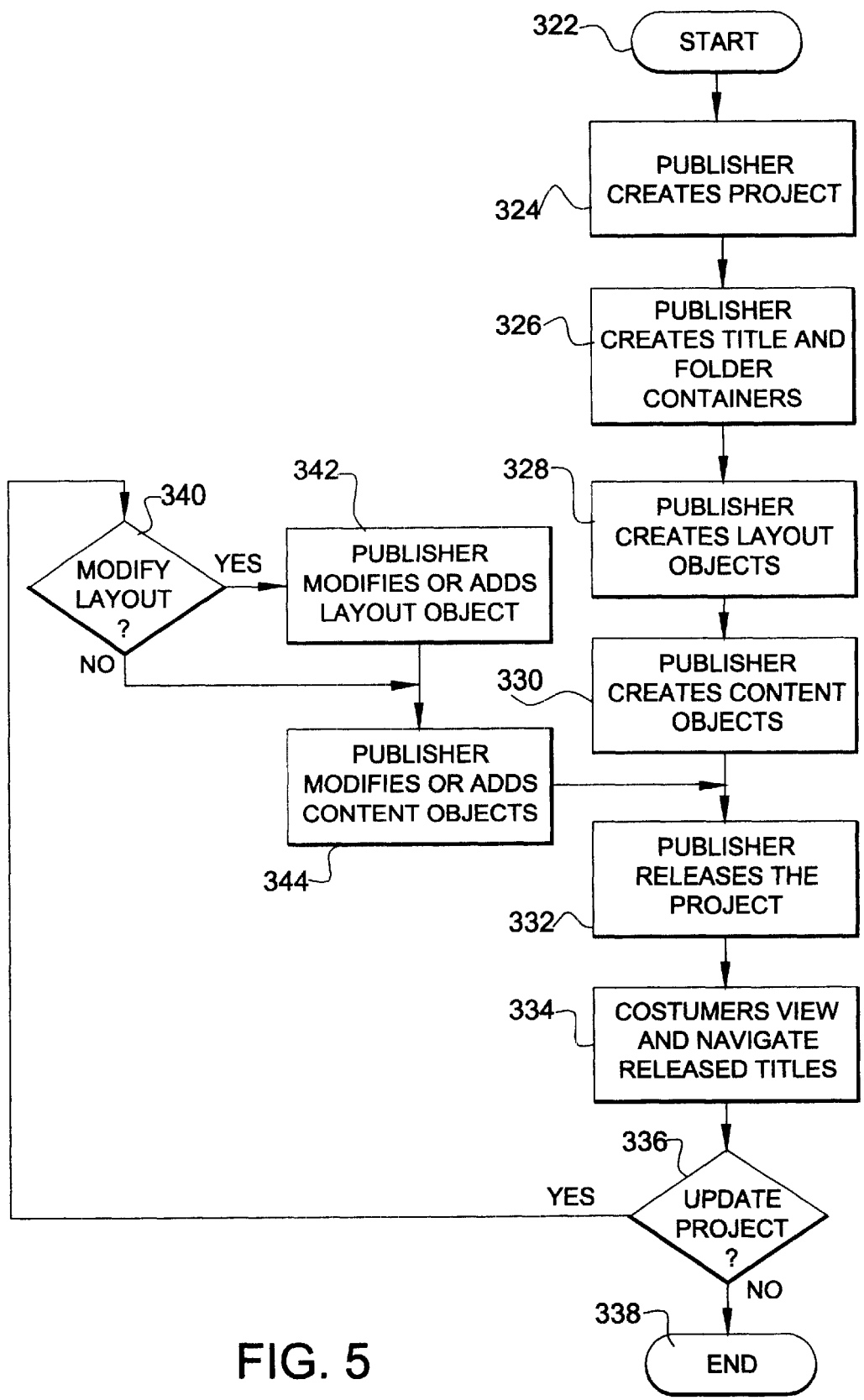
FIG. 5 is a overview flow diagram of the MPS processes performed using the system of FIGS. 1 and 2.
Figure 6:
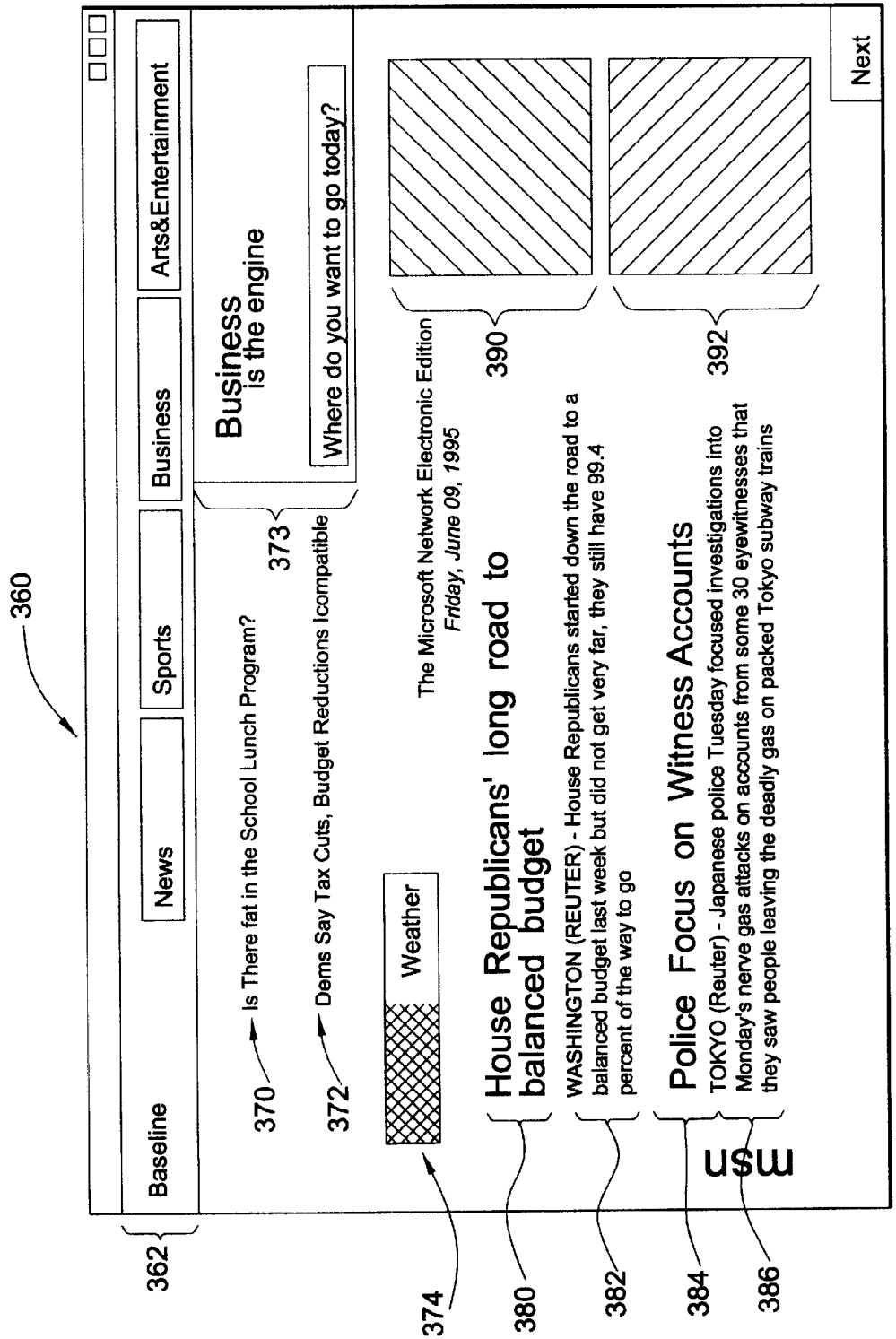
FIG. 6 is an exemplary screen display of one page of a title as displayed by the viewer of FIG. 2.
Figure 7:
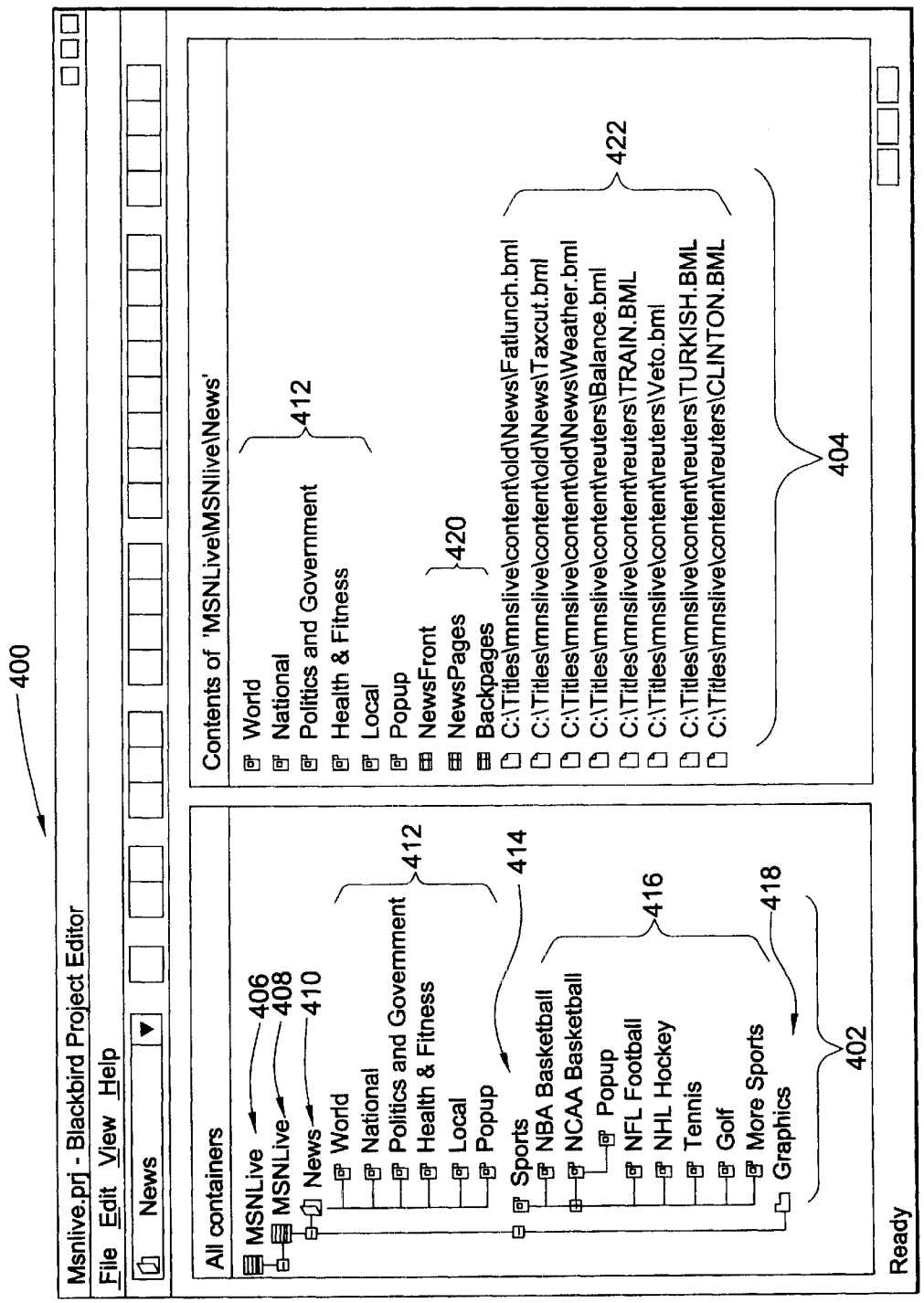
FIG. 7 is an exemplary screen display of the parts of the content and layout for the title displayed in FIG. 6.

A top level system flow diagram is presented in conjunction with FIG. 5 and exemplary Viewer screen displays that could be seen during the processes of the system flow diagram are described in conjunction with FIGS. 6 and 7. An example of the rendering process that relies on style sheets and content retrieval is presented in conjunction with FIG. 8.

A. Separation of Design and Content in the Multimedia Publishing System

As discussed above, the MPS architecture maintains a clean separation between design information and the content to which that design will be applied. A publisher's collection of page layouts is in the form of one or more titles. A title is a collection of page layouts, in a particular sequence which relates to the order in which pages will be viewed. The page layouts describe how the client area of a window will appear when a page is rendered. Rendering refers to the creation of a bitmap of a display screen in memory prior to displaying the screen. A complete page layout is created by placing controls on a blank page layout, where each control delineates an area where some piece of content should be displayed. Settings on each control determine the proper place to look for the content to be displayed in that control.

The content takes the form of discrete objects, each of which compose one unit of information, e.g., a story or a picture. These content objects are of well-known and public data formats, and may be created using any tool that supports these data formats. Content objects generally do not have formatting information encoded within them.

When the publisher has created the title (with its page layouts) and the content objects, the title and content are published together to the public distribution point. Consumers download the title and content objects to their personal computer, where the MPS viewer software uses the page layouts in the title to compose the content in the visually rich form designed by the publisher.

B. System Configuration

Referring now to FIG. 1, the basic system configuration of the multimedia publishing system (MPS) 100, which is a preferred embodiment of the system 100, will now be described. By convention, the term title is used to describe the overall plan or instructions for assembling the complete on-line MPS application on a customer's computer.

Much of the power of the MP system 100 resides in its ability to fully separate design and content, unlike existing on-line and multimedia publishing tools which require a publisher or content provider, such as a first publisher 102, a second publisher 104, or a publisher M 106 to integrate design and content. In the MP system, titles, such as a title A 140, title B 142, or title P 144 can be divided into two parts: the content (148, 152, 156)—the information such as bitmaps, video clips, audio, animation, or stories that make up a title—and the title layout, also termed the design (146, 150, 154)—the overall look and feel of a title. To separate content and design using MPS rather than placing content directly on a page, a publisher can place the content, such as a set of content objects 112, 114, or 118, in one or more containers of a title and then create sections or subsections having pages with special controls, such as a set of title layout objects 110 or 116, that dynamically find and display the content at runtime.

Using this technique a publisher can change a title on an ongoing basis by merely updating the content 112, 114, 116 which has been placed into various folders or containers within the master title. When a page is displayed, it shows the updated content. This is called dynamic title synthesis or dynamic synthesis, and allows content to be continually updated without any need to modify and update the title design consisting of the individual pages, controls and hand-placed content used to display the content.

When publishers use dynamic synthesis they are creating titles which contain placeholders that will be filled-in by the changing content. When dynamic synthesis is utilized, a title is used as a template and a pressing is the displayed, filled-in title. Each time the publisher updates the content in a title and makes it available for customers, such as a first customer 160, a second customer 162 or a customer N 164, the publisher is creating a new release of that title. When the customer starts to view that release, a "pressing" is made which contains part or all of the content in the release.

A major advantage of this approach is flexibility. Some parts of a title may be created by hand-placing content directly on a page, and other parts may be created using dynamic synthesis. Notice, however, that content hand-placed directly on pages is static—it changes only when the people involved in creating the title update the pages.

Returning to the creation of title layouts and content by the publisher, after creation, the title layouts 110, 116 and content 112, 114, 118 are released and stored in a publication storage 120. The storage 120 can be implemented in many forms, such as a network 122, CD-ROM 124, and other means of storage, such as bulletin boards, magnetic media, cable television and so forth. The presently preferred network 122 is the Microsoft Network (MSN), which is part of Windows 95. Many customers will use a MSN Explorer tool to acquire and activate MPS applications.

The MSN Explorer is the integrated navigation tool within Windows 95 that is also used to browse the MSN hierarchy. Sophisticated customers may use other more advanced MPS features, such as search, scheduling, and automatic delivery, assuming these features have been activated by the publisher. Besides browsing via the Explorer or scheduling automatic home delivery, there are several additional ways customers can obtain MPS applications. For example, an individual application may be distributed via floppy disk or CD-ROM 124, it may be distributed through E-mail or bulletin boards, or the application may be directly accessible via a link in other applications (such as the Microsoft Network yellow pages system). In each of these situations, the MP system 100 acquires an application for the customer.

C. System Components

Referring now to FIG. 2, the preferred basic components of the MP system 100 will now be described. The system 100 includes a set of tools for designing, developing and viewing multimedia on-line applications. A publisher, such as the publisher 102, utilizes a publisher workstation 182 and a Designer software environment 194 to create and publish the title layouts 110 and content 112. In the system 100, a publisher could possibly just create content and use the title layouts of another publisher. The title layouts and/or content are preferably stored in a network 122 that includes a high-performance server for hosting on-line applications. The preferred network 122 will be further described in conjunction with FIG. 3. A customer, such as customer 162, utilizes a customer workstation 182 and a runtime Viewer software component 202 to find and activate MPS titles, stored on the network 122, on a visual display at a workstation 182.

The Designer 194 is an extensible design and development environment that includes several preferred software components. These include a project editor 184 to manage tiles, containers, and objects; a page editor 186 to create and layout pages; a word processor, such as Microsoft MPS Word, for creating content optimized for the MP system 100; and optional third-party tools, such as a sound editor 190, an image editor 192, and another media object editor 193 to create and modify sound, image, video, animation and other content objects. For authoring textual content, the preferred text editor is an enhanced version of the Microsoft Word 6.0 wordprocessing program for creating tagged, hypertext documents. Together, these programs form the Designer Component 194.

The project editor 184 is used to invoke a style sheet editor 187 that is used to create and edit style sheets. The style sheet editor 187, and portions of the project editor 184 and page editor 186 will be described in detail in subsequent sections of this discussion.

The MPS Designer 194 is a page or forms-based development system similar to Visual Basic. The development environment is graphical and easy to use. Controls, which represent the components of a MPS application that will appear on-screen, are laid out within MPS pages. MPS pages and controls are preferably based on Object Linking and Embedding 198 (in FIG. 2) (OLE), Microsoft's component software technology. OLE, which presently is at version 2, is further described in *Inside OLE* 2 and *OLE* 2, *Programmer's Reference*, Volumes 1 and 2, all of which are published by Microsoft Press, and are hereby incorporated by reference. However, other compound document architectures such as OpenDoc could be used as well.

The MP system 100 includes a number of pre-packaged controls such as navigation controls, rich-text controls, multimedia controls, and other special controls specifically designed to support the creation of MPS applications. Because MPS is based on OLE, third parties can also design their own controls for use within MPS (using the Microsoft OLE Control Development Kit that is bundled with Microsoft Visual C++ 2.0). In this way, the MPS development environment is fully extensible so that customers can add new capabilities to their MPS applications by purchasing additional controls from third parties or by creating their own controls. The MPS development environment also includes a Visual Basic for Applications (VBA) scripting and debugging system.

While content is displayed within controls that have been laid out on MPS pages in the MPS Designer 194, content can be authored in any number of existing Microsoft and third-party tools. One such tool for authoring hypertext is an enhanced version of Microsoft Word that supports special MPS features for creating and tagging MPS text. Other existing tools for creating bitmaps, complex drawings, and other multimedia content can be used to create the content displayed within any particular OLE Control. In addition, most existing OLE Controls (.ocx executable programs) will work in the MPS environment although they may not be optimized for on-line applications. For example, a standard AVI OLE Control could be placed in an MPS application.

The controls that are part of the MP system 100 are optimized for low bandwidth on-line delivery of data. However, it should be noted that a other high bandwidth data delivery systems could be used without departing from the spirit of the present invention. The MPS 100 is designed to operate with information that can change from minute to minute, daily, or monthly. So while MPS can be used for creating static titles that are hand-crafted and cannot be easily updated on an ongoing basis, the main focus of the MP system 100 is to provide an efficient, cost-effective mechanism to manage the creation and management of dynamic, continually changing on-line applications. At the same time, as an open development environment, many of the tools commonly used for creating static multimedia content can easily be incorporated into the MP system 100.

When activated by the customer, the Viewer 202 examines the components of a selected title to see if any of the information required to display the pressed title needs to be acquired. It then acquires this information from publication storage 120 or local storage at customer workstation 182 and organizes it so that it can be displayed to the customer 162. Thus a pressed title captures the set of information that is displayed to the customer at a given point in time. In other words, some titles might produce a new pressing every day, or more frequently as the content changes. On the other hand, other titles may be static; when a static title is activated there is no need to do another pressing, once the content has not changed.

While pressing a static title may seem unnecessary, the process of organizing and displaying the pressing can take into account customer preferences and display device characteristics. For example, suppose a customer activates a static title on a laptop when using the laptop screen and then later activates the same title when the computer is attached to a larger display. The second activation will result in another pressing to take into account the much larger screen area if the publication has enabled such an option. When the title is activated, the MPS Viewer 202 determines if the title is out of date; acquires any needed information; and then, if necessary, creates and possibly personalizes the pressing.

The MPS Viewer 202 enables customers to perform the following actions within the limits defined by content providers: select and personalize the information a title acquires, modify the overall structural properties of titles, personalize the look and feel of titles, manage and archive the content customers acquire, and view billing and pricing information.

The requirement for the preferred publisher workstation 180 is a Windows 95 workstation with the minimum hardware configuration necessary to run the MSN sysop tools and to store and display the titles under development. The preferred Windows 95 workstation has, at a minimum, an Intel 486 processor running at 33 MHz or better with eight Megabytes of memory. A 9600 baud or faster modem is required to run the MSN sysop tools. For multimedia titles, this includes a MPC2 compliant (multimedia configured) workstation.

The MPS Viewer 202 should be installed on the customer workstation 182 before an MPS title is activated. The presently preferred customer workstation is capable of running Windows 95. To make this installation easy, the Viewer 202 is automatically installed onto the customer workstation 182 the first time the customer connects to MSN and the MP system 100 is enabled. MPS titles may include resources such as fonts, Dynamic Link Libraries (DLLs), and OLE controls that are placed into the resource container or folder of MPS titles. Before customers can view such titles, these resources are installed on their workstation 182.

D. Network Storage

Figure 3:
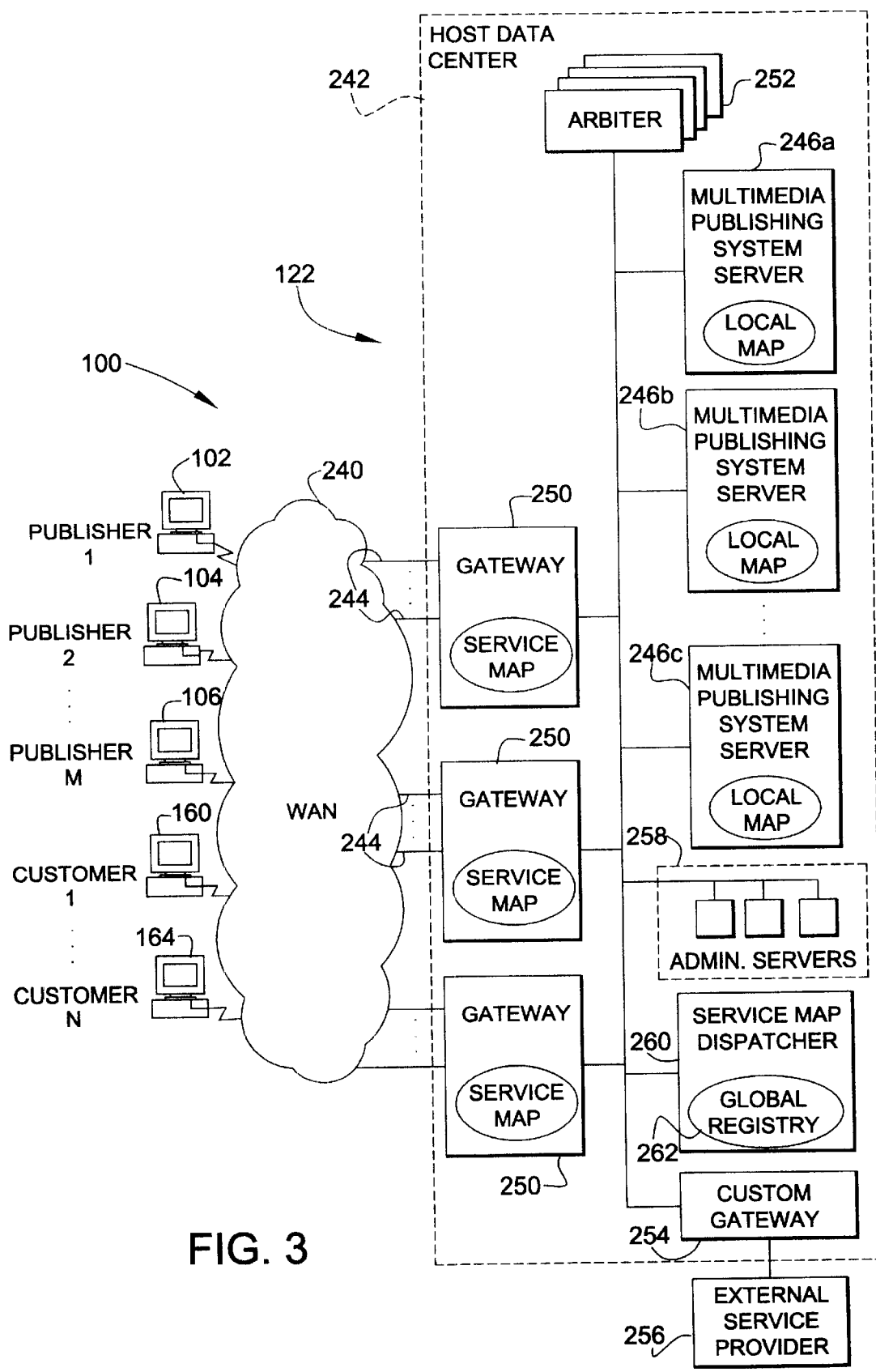
FIG. 3 is a diagram of a exemplary network storage subsystem, which is an implementation of the publication storage shown in FIG. 1.

Referring to FIG. 3, an exemplary network storage subsystem 122 will be described. FIG. 3 is a high level diagram illustrating the basic components of an on-line network 122 in accordance with one embodiment of the invention. Multiple publisher workstations 102, 104, 106 and customer workstations 160, 164 are connected to a host data center 242 by a wide area network (WAN) 240. The publisher workstations preferably have high speed connections to the WAN 240. The wide area network 240 includes WAN lines 244 which are provided by one or more telecommunications providers, and which allow end users (i.e., publishers and customers) over a wide geographic area to access the host data center 242 via modem. The WAN lines 244 preferably include both X.25 lines and ISDN (Integrated Service Digital Network) lines.

The host data center 242 comprises a plurality of application servers 246 connected to a high speed local area network (LAN) 248 (which may include multiple LANs). Each application server 246 has a unique server ID. As shown in FIG. 3, three of the servers 246 are MP System servers (246a, 246b and 246c). Also connected to the LAN 248 are multiple Gateway computers 250 also referred to as Gateways, which link incoming calls from end users to the application servers 246.

It is envisioned that the host data center 242 may advantageously have on the order of one hundred Gateways 250, and between several hundred to several thousand application servers 246. A host data center of this type will be able to handle tens of thousands of simultaneous user logon sessions.

As described below, the server side of each on-line service is preferably implemented using one of the following: (1) a single application server 246, (2) a set of "replicated" application servers (i.e., application servers which run the same service application or applications) that provide access to replicated (and locally-stored) copies of service "content" data (i.e., data provided to end user's of the service), or (3) a set of replicated application servers that provide access to server-specific (non-replicated) service content data.

The host data center 104 also includes multiple Arbiter computers 252 that monitor, record and process certain types of transactions to ensure consistency among replicated application servers. The host data center 104 also includes one or more custom Gateway computers 254 which link the host data center 104 to one or more external service providers 256, such as a credit card service that validates and executes credit card transactions.

The host data center 104 also includes a number of administrative servers 258. The administrative servers 258 perform administrative functions such as accounting, billing, network management, backup, system security, performance analysis, and server-to-service allocation.

To route user service requests to the appropriate servers 246, the Gateways 250 must have some way of determining the unique IDs of the servers that are currently handling the requested services. This is accomplished by means of a service map (not shown), which contains information about every service and server 246 in the host data center 242. The service map is preferably generated by a service map dispatcher 260, which may be implemented on a single computer.

In addition to generating a service map, the service map dispatcher 260 maintains a central repository of information referred to as the "global registry" 262. The global registry 262 contains various information about the present configuration of the host data center 242. For example, for each service group, the global registry 262 indicates the IDs of the servers 246 of a service group, and the identity of the Arbiter computer 252 (if any) which is assigned to the service group.

Further disclosure of the preferred network 122 is provided in a copending application also assigned to the assignee of the present application, Microsoft Corporation, entitled "Architecture for Scalable On-Line Services Network", Ser. No. 08/472,807, filed on Jun. 7, 1995, and a divisional application entitled "Architecture for Scalable On-Line Services Network", Ser. No. 08/794,350, filed on Feb. 3, 1997.

E. Container Hierarchy

Figure 4:
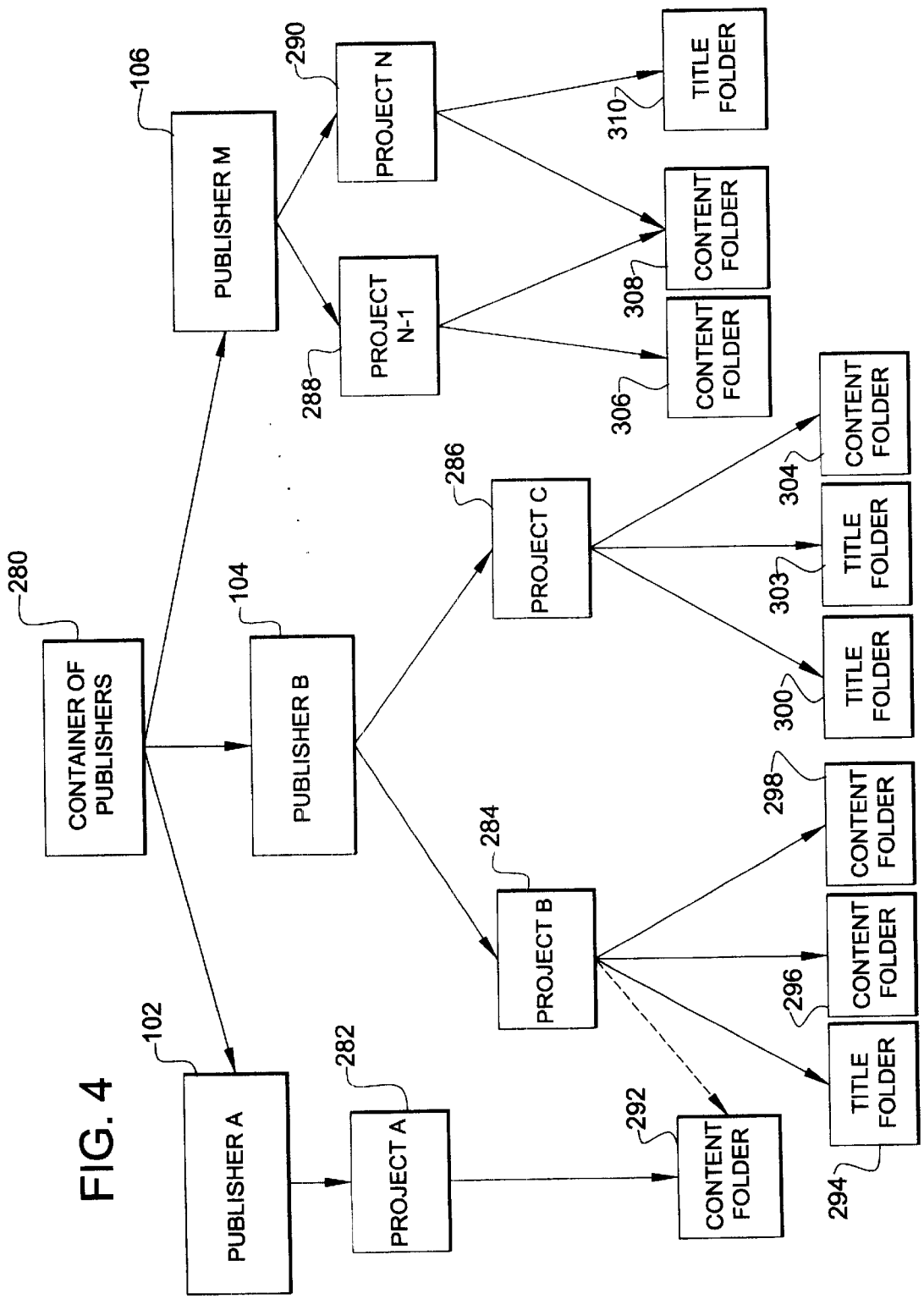
FIG. 4 is block diagram of a hierarchy of containers for a plurality of publishers using the system of FIGS. 1 and 2.

Referring now to FIG. 4, the high level hierarchy of containers for a plurality of publishers using the MP system 100 will be described. In the presently preferred embodiment, the MP system 100 utilizes a specific directory structure with the MSN directory tree. This structure is rooted at a specific folder (specified via the MSN global registry 262) known as a container of publishers 280. Every publisher 102, 104, 106 will have at least one container or folder called a project. For example, the publisher 102 has a folder called Project A 282, the publisher 104 has two folders called Project B 284 and Project C 286, and the publisher 106 has two folders called Project N–1 288 and Project N 290. Content folders and/or titles are dropped into the folder of the publisher.

Allowing for multiple projects satisfies the needs of a large publisher. For instance, a project could be assigned to one magazine (e.g., gardening) and another project could be assigned to another magazine (e.g., motorcycling). Thus, each month's issue could be archived as a title according to volume and number in its respective project.

As an example of how projects could be configured, Project A 282 only has a content folder 292; Project B has a title folder 294, and two content folders 296 and 298, along with a link to the content folder 292 of publisher A 102; Project C has two title folders 300 and 302 that could share a content folder 304; Project N–1 has a title folder 306 and a content folder 308; and Project N has a title folder 310 and shares content folder 308 with Project N–1. Publisher 102, for example, could be a provider of raw statistics in content folder 292 but does not want to generate title layouts. The publisher 102 may have an agreement with the publisher 104 for the publisher 104 to allow access and use of the content in the content folder 292. The publisher 106 has two projects 288 and 290 that share the content folder 308, for example, due to the common subject matter of titles in title folders 306 and 310. As illustrated in FIG. 4, a project, such as the project 286, may contain multiple titles folders.

F. Top Level Flow Diagram

Referring now to FIG. 5, a top level flow diagram of the processes performed using the MP system 100 will now be described. The flow diagram and this description introduce the process 320 a publisher 102 or information content provider (ICP) would use to design and distribute MPS titles.

As previously stated, a title is a publication, application, or service created using the MP system 100. A title consolidates the set of instructions for assembling the information that is displayed to the customer 160. Customers see titles as icons on the Microsoft Network, on CD-ROMs, or in a file system. By double-clicking (activating) on the title, name or icon, the customer can interact with the title.

Creating a Title

The MP system 100 is designed to support large teams creating complex online applications, as well as small teams creating individual works (and anywhere in between). This section, however, discusses only the more complex, high-end operations. In simpler scenarios, one person could perform more than one of the roles described below, and the amount of materials (stories, artwork, advertisements, and so on) would be more limited than the materials described here.

The process of creating and publishing a MPS title can be broken into a title-design phase and a release-creation phase. The process is set up so that all of the content and layout that is common across releases can be performed once in the preparatory design phase, and then left alone. This allows for a smaller team and faster turnaround in producing each release.

Title Design

The process of creating a new title begins with the editor. Assisted by business development staff, the editor decides on a target customer base, and on a concept for the title that will appeal to that base. This design team then develops that concept into a proposed organization for the contents of the title.

Before content can be put in place, a framework for the title must be created. This involves:

Creating a section hierarchy within the title.

Creating content folders to store stories, advertisements, and other pieces of content.

Creating search objects in each section of the title that draw content from the appropriate content folders using specified criteria.

In some organizations, this work will be done by the editorial staff. In others, it may be done by the production staff.

Once the basic framework is in place, the art department can create artwork to fill in the title's common elements. This includes:

A style sheet describing font usage and text layout.

Form layouts for sections that dynamically gather their content.

Form layouts for sections that are always the same (cover, title pages, mastheads, and so on)

Logos.

Optionally, organizations may want to include developers in the title design process. For example, the particular application being designed may benefit from the use of custom designed OLE Controls. These controls could be purchased, or developed in-house using the Microsoft Visual C++ development system. Additionally, the advanced features of the Blackbird system, including accessing the API or scripting controls to respond to events or automatically perform actions at runtime would require some development work, either in the high level scripting language (VBA), or in a lower-level language such as C++.

Authoring and Title Release

Once the framework is created, the staff can now turn their attention to creating individual releases. All of the work done in the conceptual phase above is potentially re-usable for every release. In fact, for a title with little need for detailed artwork, the rest of this process could merely be a matter of dropping edited content (including advertisements) into content folders.

For dynamic titles, most (and potentially all) of the work is done within the Content Authoring environment. For static titles, it could all be done within the Title Design environment. In practice, most releases will involve some work in both of these environments.

Writers Provide Tagged Content

Content authors—including editors, writers, reporters, and forum managers—generate content, including structured stories, using the content authoring environment. Writers compose the textual content that appears in a title (or a release of a title). They hand their materials off to the editorial staff. The editorial staff is in charge of the overall content of the title. For multimedia titles, this role is very similar to the director of a motion picture or television program.

The content authoring environment supports a variety of tools, such as, for example, a MPS document editor. The MP system 100 also supplies tools to specify and manage links and to specify story properties. Third-party tools may also be added to the content authoring environment.

From a content author's perspective, creating structured stories can be as simple as typing them in the MPS document editor and applying certain styles. More sophisticated content can be created though a variety of means, such as including links to graphics or placing special properties on a story.

For content providers that do not want to expend much effort creating tagged content, the MP system 100 includes MPS document editor templates that handle most of the tagging for the author.

Editorial Staff Chooses Content

Once the editorial staff has chosen the stories they wish to include in a release and are satisfied with the content of those stories, they pass them on to the art department to select and insert appropriate artwork, and to the production staff to place in content folders.

Art Department Supplies Specific Art

The artistic staff is responsible for designing the more graphical aspects of the title. In the early conceptual phase, graphic artists work with the editor to design a distinctive look and layout. This includes font styles, colors, titles, logos, and page layout templates. The term "art department" is used in the broadest sense here. In the multimedia world, the role of an art department goes beyond traditional print-based artwork.

The art department in many cases inserts the artwork into the stories and tags that artwork so that it will presented appropriately (placed inline in the story text, as a wrap, or as a pop-up). They then pass the stories on to the production staff to be placed in content folders. In the case of static titles, the art department designs new pages and gives them to the production staff to be placed in the title framework.

Advertising Department Supplies Copy

The advertising sales staff sells advertising space in each release. The advertising sales department collects copy from advertisers who have bought space in the release, and delivers the copy to the production staff to be placed in content folders.

Production Department Does "Paste-up", Proofing and Release

The production staff does the fundamental tasks, such as paste-up, necessary to put a title or release together. Once the production staff has everything that goes into the release, they "paste up" the release by placing everything in its appropriate place and performing a "test-pressing" to make sure that nothing is missing. The editors, art staff, production staff, and advertising staff review the test-pressing to make sure that everything looks and works correctly. Once everyone is satisfied, the production staff places everything on the publisher's server and releases it to be copied to additional servers at the Microsoft Network data center.

Top Level Flow

The process 320 begins at a start state 322 and continues at a state 324 wherein the publisher 102 uses the MPS project editor 184 (FIG. 2) to create a project on their workstation 180. A project, such as project C 286 (FIG. 4) contains all the information needed to build and distribute one or more titles and any associated content.

Moving to state 326, within the project, the publisher 102 creates titles and content folders, such as title 300 and content folder 302 (FIG. 4). A title consists of nested sections that contain MPS objects such as pages or search objects. Folders typically contain MPS content objects such as stories or pictures. To make the process of managing titles, folders, and MPS objects easy to understand and use, the preferred MPS 184 project editor (FIG. 2) looks and works like the Windows 95 Explorer.

Proceeding to state 328, the publisher 102 uses the MPS project editor 184, page editor 186 and style sheet editor 187 (FIG. 2) to create the MPS layout objects such as pages, styles, and search objects. The page editor 186 is also used to place controls (each control is a program responsible for handling a displayable region) on a page.

Moving to state 330, the publisher 102 creates content objects using Microsoft MPS Word 188, or the publisher can use third-party tools, such as the sound editor 190 or the image editor 192, that produce formats that the MP system 100 can interpret.

Proceeding to state 332, the publisher 102 releases the project. In the presently preferred embodiment, releasing a project makes the titles, stories, and other MPS objects available on the Microsoft Network 122. The MP system 100 automatically connects to the network 122 and makes the titles in the project available to the customers 160, 162, and 164 (FIG. 1). Alternatively, the MP system 100 can release the title to CD-ROM 124 or other storage/communications media.

Continuing at state 334, the customer 160 uses the MPS Viewer 202 (FIG. 2) to read and page through (also termed navigation in an electronic publication) the released titles. As parts of the title are accessed, they are cached on the customer's computer 182 for fast access. The viewer 202 organizes and composes the objects it has collected and displays them to the customer 160.

Over time, the publisher 102 can update the project and the MP System automatically tracks the changes. Decision state 336 determines if the publisher desires to update the project. If the publisher does not wish to update the project, process 320 completes at end state 338. However, if decision state 336 is true, that is, the publisher desires to update the project, the process 320 moves to a decision state 340 to determine if the publisher 102 desires to modify the layout in the project. If so, the process 320 moves to state 342 wherein the publisher modifies one or more existing layout objects or adds one or more new layout objects. If the decision state 340 evaluates to be false, or at the completion of state 342, the process 320 moves to state 344 wherein the publisher modifies or adds one or more content objects. At the completion of state 344, process 320 proceeds to state 332 wherein the project is released again. Releasing the updated project ensures that the proper set of layout and content objects are made available to the customer 160 (FIGS. 1 and 2).

G. Exemplary Screen Display of Title

Referring now to FIG. 6, an exemplary screen display 360 of a page of a title as displayed by the Viewer 202 on the visual display at the customer workstation 182 (FIG. 2) will now be described. The screen display 360 corresponds to a World News section of a MSNLive title using a NewsFront page layout which has been named NewsFront by the designer. A tabbed horizontal bar 362 near the top of the screen 360 is handled by a caption button control showing the major sections of the title. By selecting a section name (by use of a pointer device like a mouse, not shown, but which is a part of or connected to the workstation 182), the customer 102 can navigate directly, through a link, to the selected section.

Below the bar 362 of screen 360 are two headlines 370 and 372 which are the result of an outline control that can be used as links to corresponding stories on another screen of the title. Block 373 in this example contains an advertisement resulting from a picture control. Block 374 contains a graphic and text resulting from a picture button control that provides a link to a weather screen. Areas 380 and 384 display headlines for corresponding abstracts 382 and 386, respectively, and are the result of an outline control. By selecting the headline 380 or 384, the customer can navigate to the body of the corresponding story on another page of the title. Areas 390 and 392 display picture objects corresponding to the headlines 380 and 384, respectively, and are the result of picture controls.

The objects and placement of the objects on the displayed page 360 are determined by the publisher 102. Of course, other objects or placements of objects could be utilized by the publisher 102.

H. Exemplary Screen Display of Project Editor Window

Referring now to FIG. 7, an exemplary screen display 400 of the parts of the content and layout for the example title displayed in FIG. 6 will be described. The Project Editor window 400 is the main interface for the Designer 194 (FIG. 2). The window 400 is intended to closely mimic the Microsoft Windows 95 Explorer. Using this window 400, the publisher can open, edit and save a project, as well as release the contents of that project to the MSN Data Center 242 (FIG. 3). An approximately left one-third of screen 400 is a display area 402, also known as a left pane, that shows the hierarchy of containers of one project for a publisher and allows the user to navigate through it. The left pane shows only containers (folders, titles, and sections). An approximately right two-thirds of the window 400 is a right pane 404 that shows the contents of a container selected in the area 402 by the user of the project editor 184 (FIG. 2).

Referring to the left pane 402 of the window 400, the top level of the hierarchy of containers is the project "MSN-Live" 406. Just below the project is the title "MSNLive" 408, which in this example has the same name as the project 406. In another example, the project could have multiple titles, such as January and February issues of a magazine. Below the title in the example hierarchy are two sections: "News" 410 and "Sports" 414. Also at this level in the hierarchy is a content folder 418 labelled "Graphics", which holds the picture objects used by the project 406. Below the sections 410 and 414 is a set of subsections 412 for the "News" section 410 and a set of subsections 416 for the "Sports" section 414. The "News" section container 410 has been selected by the user, which is evidenced by the highlighting of the section label "News" and the opened section icon to the immediate left of the "News" label.

Referring to the right pane 404, the layout objects and content objects directly contained within the selected container in the left pane 402 are shown, e.g., the objects of the "News" section container are displayed in this example. The left pane 404 uses standard Explorer views, as well as a special view built for the window 400, which sorts according to a user-defined order and allows the user to change the order by dragging and dropping each objects' icon. The objects are preferably grouped by type of object, such as, for example, subsection objects 412, page layouts 420 and content objects 422. The order of the pages and content objects is significant. The title maintains a sequence ordering of the sections, pages, and search objects, as this is important in determining how the title is displayed. Within a section, the pages have a sequence that determines the order in which they are used to press content and the order in which they are displayed when the user browses sequentially. In a static section, pages are displayed in the order shown in the project editor window 400.

A dynamic section uses the dynamic story control (FIG. 8) to display stories within a section. The stories are sorted according to rules specified on the section's property sheet and then are concatenated or linked together. The stories are then filled into the dynamic story controls on each page in the section, in the order in which the pages are arranged in the section. If there are more stories than there are pages, the last page is re-used repeatedly until all content has been pressed. For instance, in FIG. 7, the Backpage in pages 420 would be reused.

Toolbar buttons and corresponding menu commands allow the Publisher to quickly add new objects to the titles and folders within the project 406. Clicking a button will add a corresponding object to the container selected in the left pane 402. Only those objects that are allowed to be in the selected container have their corresponding toolbar buttons and menu items enabled.

I. Example of Rendering Process

Figure 8:
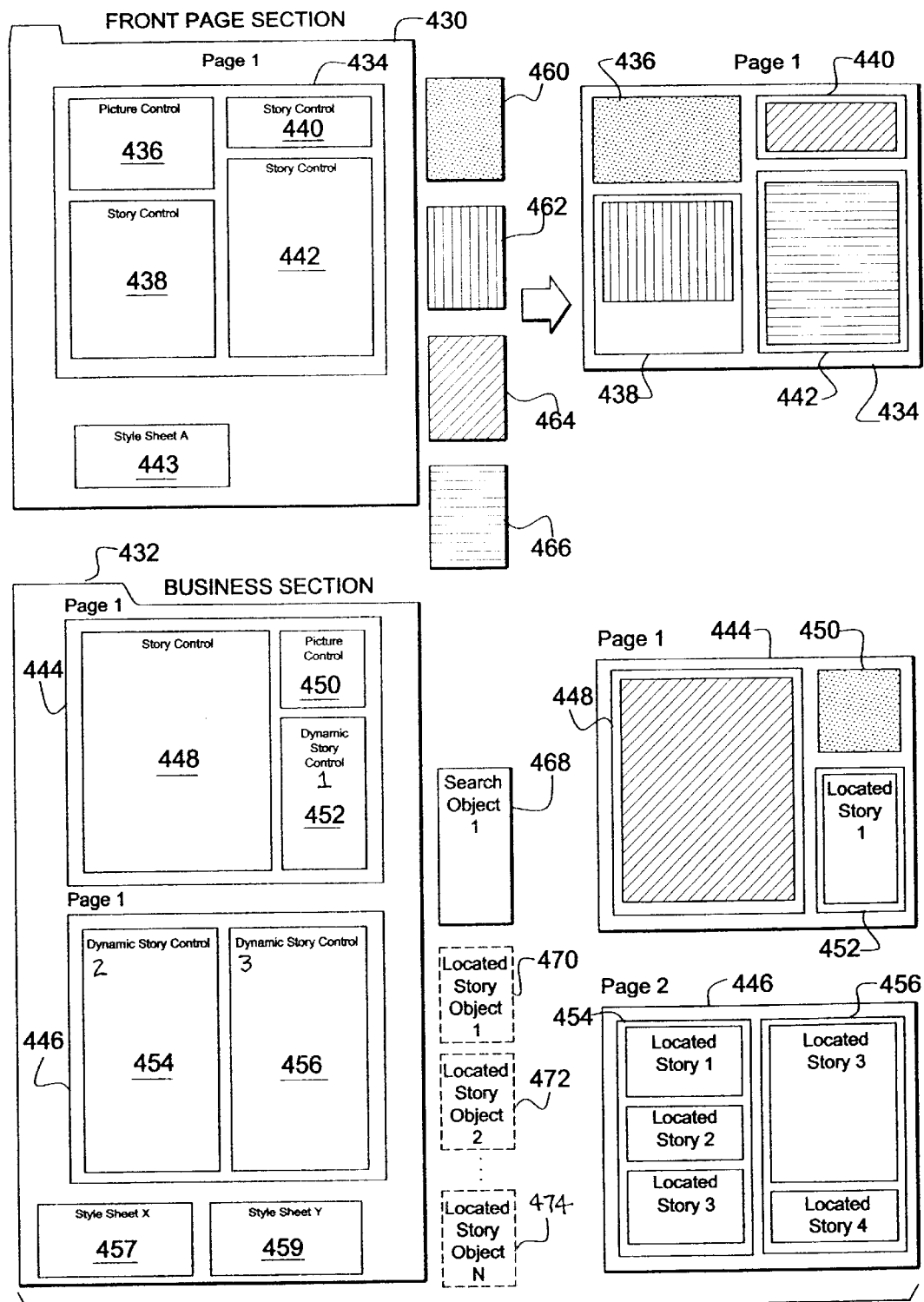
FIG. 8 is a block diagram of the interaction of page layouts, controls, and style sheet and content objects at the viewer of FIG. 2.

Referring now to FIG. 8, the interaction of page layouts, having controls, and objects at the Viewer 202 (FIG. 2) of the customer's workstation 182 to render pages will now be described.

FIG. 8 presents a diagram of front page section 430 and a business section 432 for a title, such as a newspaper.

1. The Front Page Section

The front page section 430 contains a page 434 which has a picture control 436, and a set of static story controls: a first story control 438, a second story control 440, and a third story control 442. Each static story control or picture control is linked at publication time to just one object. Each of the controls on the page 434 references a style sheet 443 to provide formatting instructions on how the content is to be displayed.

As shown in FIG. 8, a picture object 460 is linked to the picture control 436, so that upon rendering, the picture object 460 is displayed on the page 434 at a position determined by the control 436. Similarly, a story object 462 is linked to the static story control 438 and rendered into the position of the control 438 on the page 434.

Note that since the control 438 is a static story control, any area not used by the story object 462 in the area identified by the control will be blank. As shown, a story object 464 is linked to the story control 440 so that it is rendered in the area identified by the static story control 440 on the page 434. In this example, for instance, only the first paragraph of the story object 464 will be rendered on the page 434 due to the size of the control 440 (as selected by the designer). In this manner, the designer can choose to only display a portion of a linked story within a static story control by adjusting or sizing the control to only hold one paragraph, or other desired portion, of the story content. Normally, a static story control will allow scrolling of a story so that ultimately the entire story will be displayed.

Finally, a story object 466 is linked to the story control 442 so that it is rendered in the area identified by the static story control 442 on page 434. In this example, the entire story object 466 is rendered onto page 434.

It is important to note that each of these story objects makes reference to the style sheet 443 before being rendered on the page 434. When story objects are authored, they are given formatting tags that represent specific styles. As the story objects are rendered, they reference the style sheet that is linked to the appropriate control to retrieve formatting information. This formatting information includes properties of the paragraphs, fonts and embedded objects in the story that format the content as it was originally designed. Due to the separation of design and content in the MP system, the story objects themselves only have formatting tags, but do not contain a description of the particular format that corresponds to each tag. The descriptions of those tags is found in the style sheet that is linked to the control into which the story object becomes rendered. This process will be explained in more detail below with respect to FIGS. 9–15.

2. The Business Section

As also shown in FIG. 8, the business section 432 contains a first page 444 and a second page 446. The page 444 has a single static story control 448, a single picture control 450, and a first dynamic story control 452. The second page 446 has two dynamic story controls, 454 and 456. In addition, a style sheet X 457 and a style sheet Y 459 are referenced by the different controls on pages 444 and 446. The pages in the business section 432 differ from the page 434 in the front page section 430 because they rely on a search object 468 to retrieve particular stories. On the page 434, the static controls were each linked to a particular story which was then displayed upon rendering. The search object 468 is affiliated with the dynamic story controls in the section 432.

As shown in this example, the static story control 448 and the picture control 450 on the page 444 reference or link to the story object 464 and the picture object 460, respectively, and display these objects as shown on the rendered page 444. The story object 464 is thereby shared between different sections, pages and controls in the title. The entire story object 464 is displayed on the page 444, whereas only the first paragraph was displayed on the page 434. By using a similar process, a designer can choose to display just the first paragraph of a story on the first page of a title, but include the entire story on another page within the same title. As shown in FIG. 8, the picture object 460 is also shared between the control 436 and the control 450. This sharing of content between separate sections and pages is an important feature of the MP system 100.

3. Dynamic Story Controls

The dynamic story control 452 uses the results of a query performed by the title to retrieve stories matching search criteria set by the publisher (as defined by the search object 468). The search object 468 locates story objects having specific properties. In the example of FIG. 8, the search object 468 returned many story objects 470, 472 and 474 corresponding to story objects 1 through N, respectively (where N=4 in this example). All of the retrieved story objects are concatenated together by the dynamic story controls and poured into the appropriate regions on the pages. The order that the stories become rendered into the control regions starts with the first dynamic story control on the page in the section and continues to other dynamic story controls contained within the section.

If enough pages to display all the located stories are not defined in the section, the last page used is repeated until all stories are rendered. Thus, the first located story 470 is poured into the area defined by the dynamic story control 452. Since it does not completely fit in that area, the located story 470 continues across the page boundary onto page 446 into the area defined by the dynamic story control 454. The located story object 472 then begins after the located story object 1 470 ends. The next located story object (located story object 3) begins after the story object 472 ends, continuing into the next control 456 on page 446, as shown in this example. The last located story object 474 retrieved by the search object 468 in this example is then rendered into the dynamic story control 456 within page 446.

As explained above, the dynamic story controls in the section 432 use the search object 468 to display the results of queries made for specific information. For example, the search object 468 may return content that contains the word "Microsoft". Each of the stories found by the search object 468 will be displayed in the areas defined by the dynamic story controls in the format designated by the style sheet 457 or the style sheet 459.

For example, if the dynamic story control 454 is linked to the style sheet 457, then all of the stories displayed by the dynamic story control 454 will appear in the format designated by the style sheet 457. However, the stories rendered by the dynamic story control 456, when this story control is linked to a different style sheet (for example, the style sheet 459), would appear differently than the formatted display corresponding to the dynamic story control 454. In this example, if the controls 454 and 456 use different style sheets, the located story 3 would be displayed using two formats when the transition from the area defined by the control 454 to the control 456 was made.

IV. AUTHORING OVERVIEW

The present invention includes a set of authoring tools and data structures for creating content that is to be published in an on-line network. The present invention includes a story editor which is used by the publisher 102 to produce content for an on-line publishing system. The preferred embodiment of the invention uses an enhanced version of Microsoft Word® to create Multimedia Document Format (MDF) files. The enhanced version of Microsoft Word is also known as MPS Word. These MDF files are then used to provide content for displayed on-line titles as discussed below for the Multimedia Publishing System (MPS).

The enhanced Microsoft Word® includes a pair of converters to translate the Rich Text Format input/output of Word® to a Multimedia Data Format file. In addition, a document template is included to help the author produce documents with valid embedded codes. A hypertext link embedding tool to author hyperlinks and a property editor to assign find properties to the document are also included. While the preferred embodiment of the invention uses MPS Word with converters, it can be seen that any story editor or document editor with the ability to create MDF files is within the scope of the present invention.

One object in the MDF format holds text of the story that is in a newly designed markup language termed herein as the Multimedia Publishing Markup Language (MPML). MPML is a version of the HTML 2.0 with additional extensions for supporting more detailed tagging of structure as well as embedded OLE objects.

In addition to adding MDF content to a project by authoring in Word, converting existing HTML documents to MPML when added to a project is also supported. These concepts will be explained in more detail below.

The MDF files are OLE compound files containing IStreams and IStorages. There are four main parts to a MDF file: 1) the tagged text streams; 2) embedded OLE object data stream; 3) embedded OLE object result stream and 4) the find property stream as will be discussed in more detail in relation to FIG. 10. The following sections briefly describe each of these parts and their use in the MP system.

The main storage in the MDF file is the MPML tagged text storage. This storage contains two streams (Head and Body) which hold the tagged content of the document in MPML format and is read and written by the Word MPML converters. The conversion from Word's Rich Text Format to a MDF is accomplished by mapping Word styles to MPML tags during conversion. One advantage of MDF documents over HTML is the ability to place embedded objects within the structure of the document.

For each embedded OLE object there are two separate streams in the MDF file. One stream holds the object data while the second stream will hold its result (typically a Windows® Metafile). These two streams are located within the OLE storage of the embedded object. The embedded object data is output by Word in the "data" stream and can be used to instantiate the embedded object. However, a bitmap of the object is saved in the "result" stream and can be used in cases where the object cannot be instantiated from the "data" stream.

On output, the Word MPML converters extract the object data and result from the RTF default document format and store them into separate streams in the Multimedia Document Format file. The converter inserts MPML tags corresponding to an embedded object in the tagged text stream. Attributes of this tag can be set to identify the data and result streams written by the converter. On input, the MPML input converter recognizes the MPML embedded object tag, locates the streams containing the object data and results, and then inserts them back into the RTF stream passed to Word.

An additional stream off the MDF document is a find properties stream which is used to mark content so that it can be found by a search object. The find stream contains the find properties for the document. This stream is read and written by the MPS Word converters and consists of properties specified in the Word Summary Info dialog.

Once MDF files are added to a project as content, they cannot be directly edited in Word since Word cannot directly read an OLE compound file such as in MDF format. If the user wishes to edit a document that has been converted to a MDF file, it must first be exported from the project to a temporary file. The project then launches the enhanced Word, and tells it to open the temporary file. At this point, Word will use the MPML input converters to read the file and save changes. When the edit operation is complete, the project must be notified to read back in the changes from the temporary file. This is accomplished by overriding the Word Save command with macros provided in the template used for authoring MP system content.

In the multimedia publishing system, the publisher or other Independent Content Provider (ICP) authors content that is to be displayed on a page within a title. A story editor such as MPS Word is used to draft the content which will eventually be placed on the page. Another way of producing content for the MP system is to convert HTML text files into a format that can be read by the multimedia publishing system. The relationship between the project editor, story editor and HTML text file converter is illustrated in FIG. 9.

Figure 9:
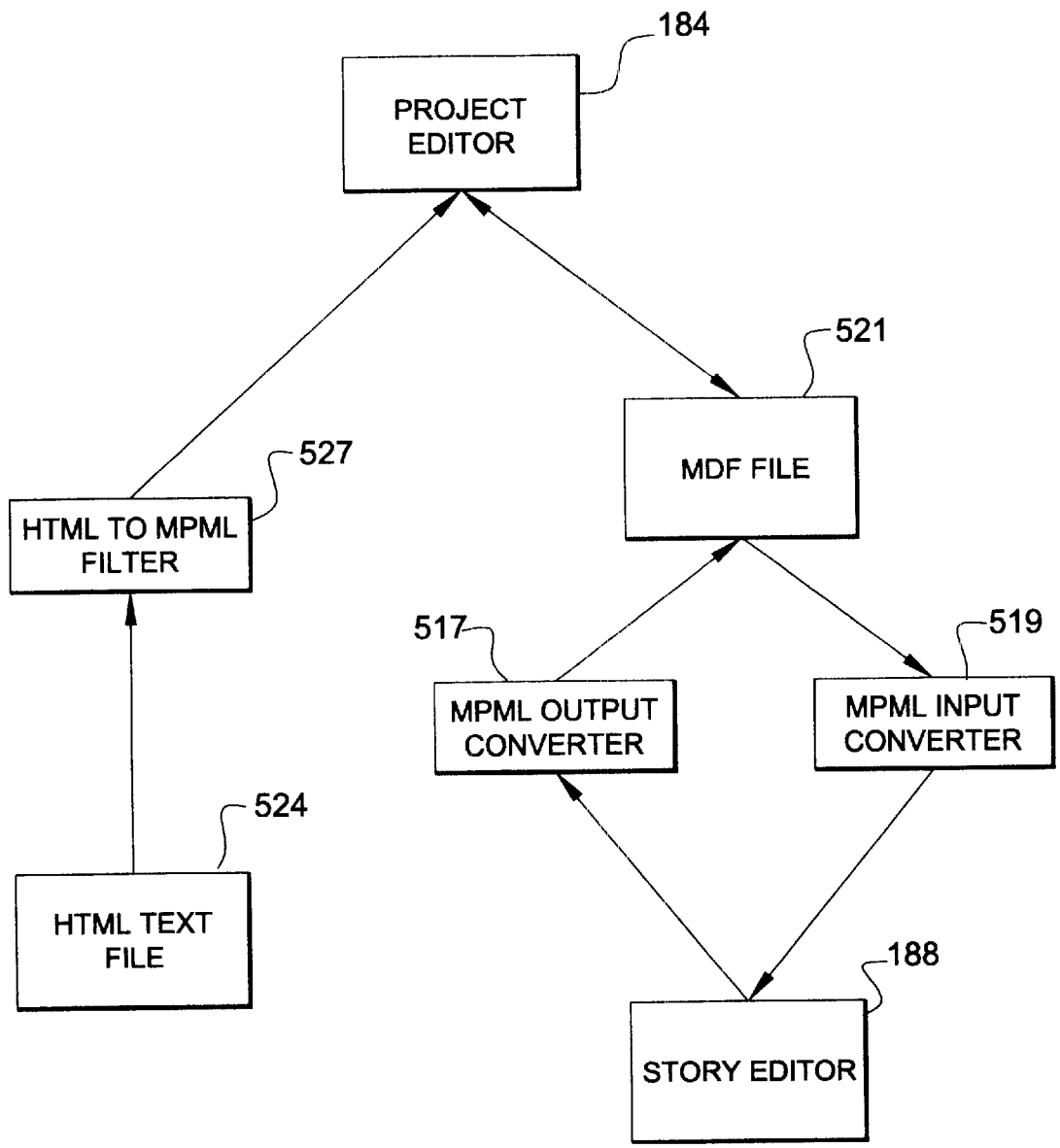
FIG. 9 is an overview block diagram showing two methods of adding content to a MP system project.

As shown in FIG. 9, a multimedia system document editor 188 (or story editor) uses an MPML output converter 517 and an MPML input converter 519 to manage saving and retrieving a Multimedia Document Format (MDF) file 521. As discussed above, the preferred story editor in this system is an enhanced version of Microsoft Word®, however, any story editor which produces a document conforming with the Multimedia Document Format discussed below is within the scope of the present invention.

As shown in FIG. 9, the MDF file 521 is linked to a project using a project editor 184 so that the content of the document 521 can be accessed by the titles created with the project editor 184. In addition, FIG. 9 illustrates a HTML text file 524 being converted with a HTML to MPML filter 527 and then linked to a project with the project editor 184. The ability to convert HTML text files into a format that can be read in the multimedia publishing system allows this system to access the great variety of HTML text files already in existence and used on other systems such as the Internet. However, as explained below in reference to FIG. 10, a Multimedia Document Format file has a number of advantages over HTML text files.

V. MULTIMEDIA DOCUMENT FORMAT FILE STRUCTURE

Figure 10:
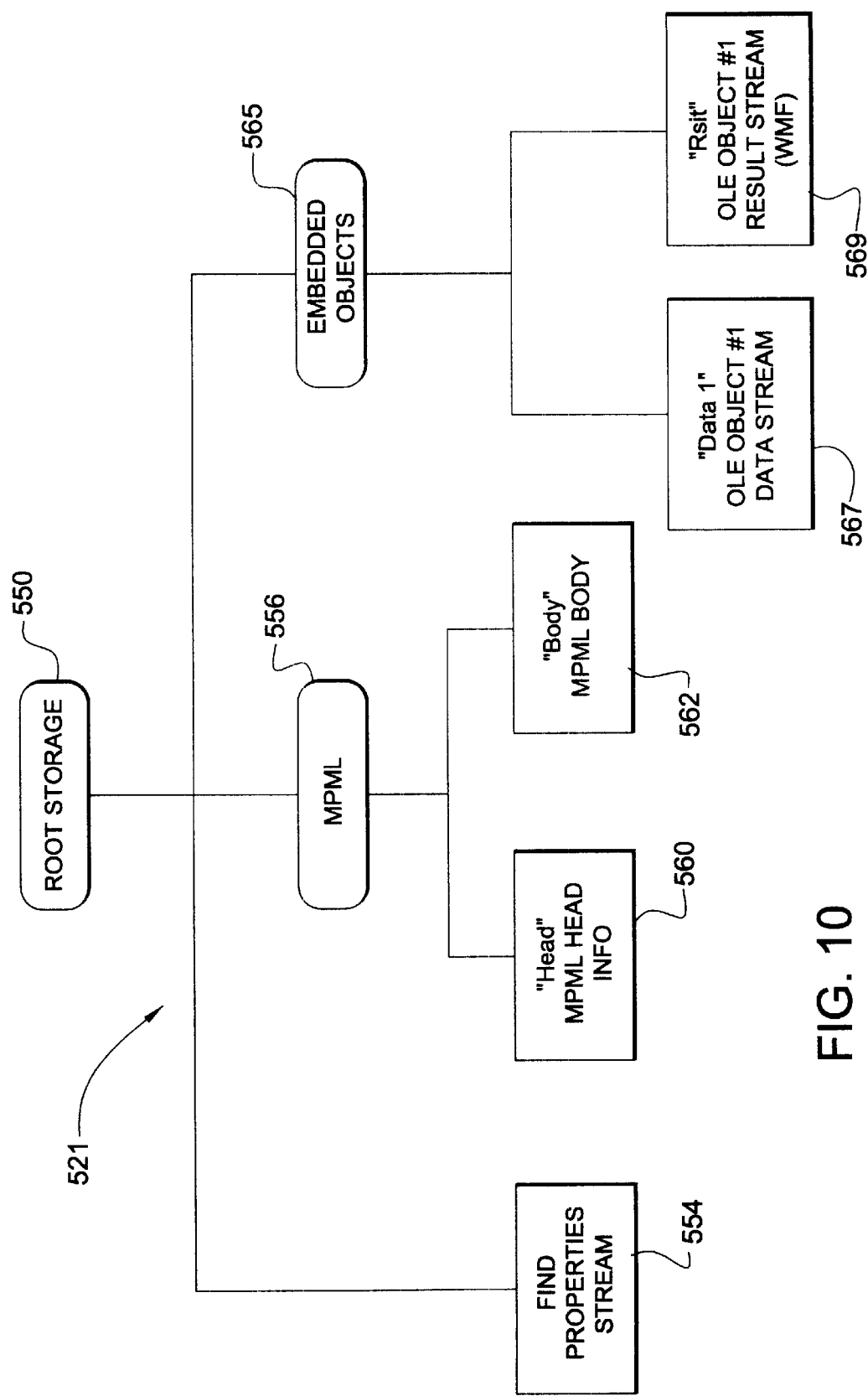
FIG. 10 is a block diagram of the structure of a MDF file.

Referring now to FIG. 10, the structure of a multimedia document 521 is illustrated. As shown, this document uses the IStorage and IStream OLE structured storage system for managing this file. As shown, a root IStorage object 550 is the root storage of the document 521. Below the root 550 is an IStorage object 552 which has a data stream 554 containing find properties of the document.

The find properties stream 554 contains data such as the author, keywords, title, data created and other information so that a search object in the multimedia publishing system can find this particular document. The find properties stream 554 consists of the following properties and formatting. Note the angle brackets and backslashes are for readability only and are not part of the actual stream (see example below).

Title=<Title><space><Zero terminated string>
Subject=<Subject><space><Zero terminated string>
Author(s)=<Author><space><Semi-colon separated list of names as zero terminated string>
Keywords=<Keywords><space><Semi-colon separated list of key phrases as zero terminated string>
Comments=<Comments><space><Zero terminated string>
CreatedTime=<CreatedTime><space><Zero terminated string in yyyy/mm/dd hh:mm::ss format>
ModifiedTime=<ModifiedTime><space><Zero terminated string in yyyy/mm/dd hh:mm::ss format>
Priority=<Priority><space><Zero terminated string with numeric value between 1 and 5 inclusive>

Example of find properties stream:
Title This is the title<null byte>Subject This is the subject<null byte>Author George Washington<null byte>Keywords Authoring, Word, Multimedia<null byte>Priority 5<null byte><null byte>

Since the find properties object 552 is stored as a separate object under the root object 550, it can be transmitted to the customer across a low bandwidth line without the rest of the MDF file. In this manner, only the find properties object 552 and data stream 554 will be transferred to the viewer. Thus, the customer can see a list of all files referring to George Washington, for example, but will not have to wait for all of these files in their entirety to be downloaded across the on-line system.

Once a customer decides to view a particular MDF file after retrieving the find properties object 552, the remainder of the file 521 will be transmitted across the wire to the customer. This separation of objects in the MDF file gives the on-line system a tremendous speed advantage over previous systems wherein the entire document had to be transmitted to the customer.

As also shown in FIG. 10, the root IStorage 550 has a substorage MPML object 556 which holds MPML tagged text from the content. The MPML object 556 has a head stream 560 and a body stream 562 which both hold data from the MPML tagged portion of the content.

The head stream 560 is used to store tagged information that is not included in the main body of the document text. For example, the table of contents (TOC) and abstract of a document would be stored in the head stream 560 of the MPML object 556. The body stream 562 holds MPML tagged text corresponding to the main body of the document. As will be described in more detail below, the tags used in the MPML text are derived from the standard generalized markup language (SGML) and HTML 2.0 that is widely know in the electronic publishing technology.

The MPML tagged text is split into a head stream 560 and body stream 562 so that if a customer requests only the abstract of a particular document, the entire body of the article will not have to be transmitted across low bandwidth wires to the customer. This concept is similar to the idea of separating the find properties object 552 from the remainder of the document so that only those properties that the customer wishes to see are transmitted to the customer. As can be envisioned, the only time that the MPML tagged text in the body stream 562 is transmitted across the low bandwidth lines to the customer is when that customer has specifically requested to view the entire document.

As also shown in FIG. 10, an embedded object storage 565 contains an object data stream 567 and object result stream 569. The ability to have objects embedded in the same document with the tagged text 556 provides an organizational advantage not found in previous on-line systems. For example, HTML documents only contain text objects. Therefore, HTML documents must be drafted without the ability of the author to easily place figures within the document.

Since the multimedia document format files can accommodate embedded objects within a single document, the process of producing complicated multimedia documents in an on-line system is greatly simplified. For example, the author can store video, sounds and graphics within a multimedia document format file using the well known "drag and drop" technique.

Briefly, the drag and drop capability allows an author to drag an icon representing an embedded object from the object editor and drop it within the document. By simply dragging and dropping the object within the document, a link is established from that document to the embedded object. Upon saving, the embedded object 565 is saved in a storage and stream below the root IStorage of the MDF file 521. The protocols and procedures for setting up IStorages and IStreams in a compound structured OLE document are well known. However, the structure of the document shown in FIG. 10 provides significant advantages over prior on-line authoring systems wherein only tagged text could be used in the on-line system. Other advantages of the document structure shown in FIG. 10 will become more apparent in reference to the following figures.

VI. USING MULTIMEDIA DOCUMENTS IN AN ON-LINE SYSTEM

Figure 11:
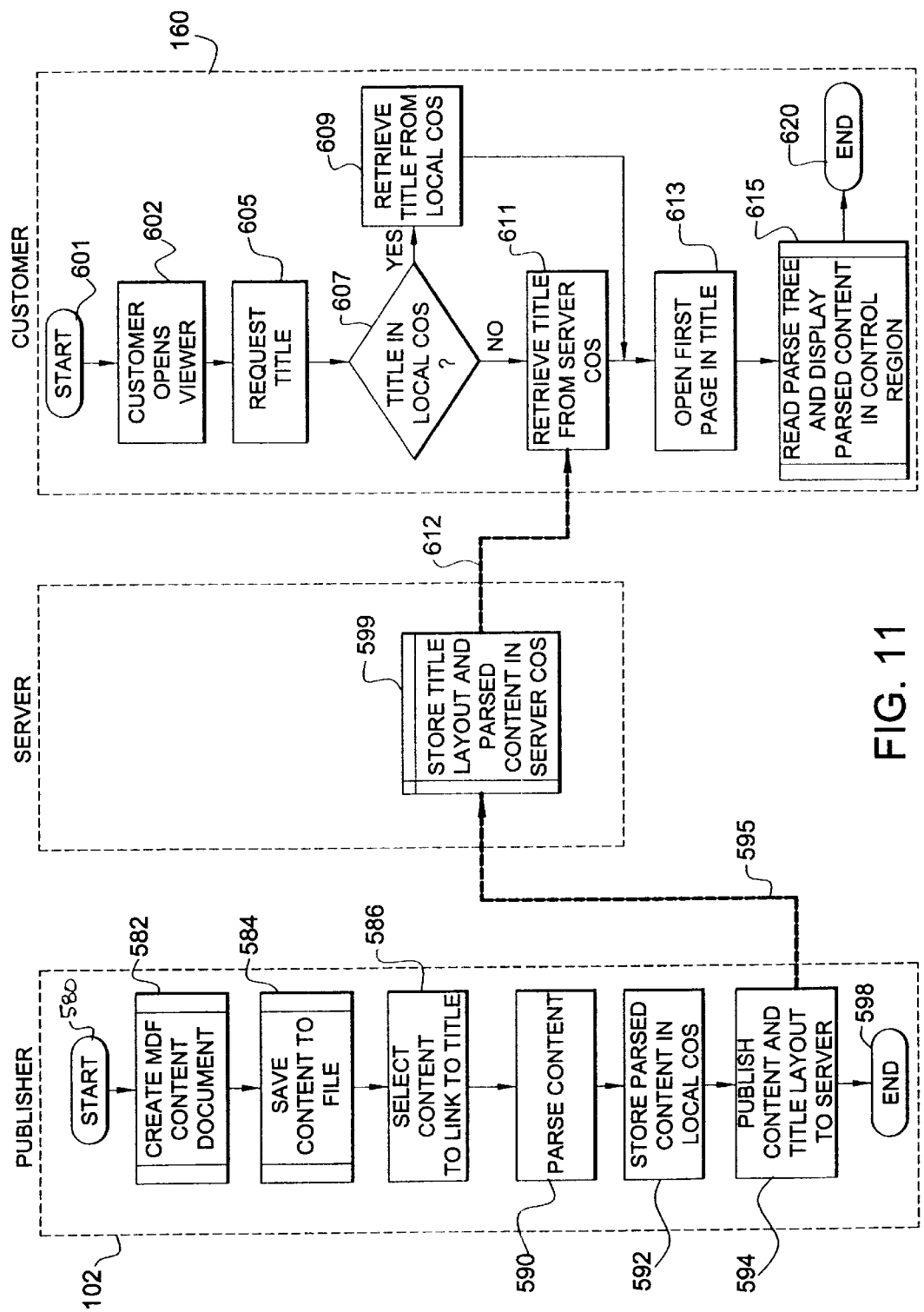
FIG. 11 is a flow diagram illustrating an overview of the process of creating content, adding content to titles, publishing and viewing the published content.

FIG. 11 illustrates an overview of the process of creating a MDF file, publishing it to a server, and having that file read by a customer. As shown in FIG. 11, a publisher 102 starts at a start state 580 to produce content for a title. The publisher 102 then creates a MDF file at process 582. Once the MDF file has been created at process state 582, the publisher 102 saves the created content to a storage at a process state 584. The methods of creating an MDF document at process state 582 and saving content to a file at process state 584 will be explained in more detail below in reference to FIGS. 12 and 13.

Once the content has been saved to a file at process state 584, the publisher selects saved content to link with a particular title. It should be noted that the publisher 102 may represent more than one individual. For example, an author could create an MDF document at process state 582 and save the content to a file at process state 584 while a designer would select the content to link to the title at state 586. It can be appreciated that any number of individuals within the publisher 102 can be responsible for creating content and releasing it to customers.

Once the content has been selected and linked to a particular title at state 586, a parsing process is begun at state 590. The actual process of parsing the content is discussed in more detail below in reference to FIG. 14. However, the parsing process that takes place at state 590 converts the MDF file into a parsed content tree having a single root with multiple nodes and branches. This parsed structure increases the efficiency of transferring content across low bandwidth lines.

Once the content has been parsed at state 590, it is stored in the publisher's local caching object store (COS). Once the parsed content has been placed in the local COS at state 592, it is available to be linked with many titles. After the parsed content is linked to a title at state 586 and stored in the local COS at state 592, the content and title layout can be published to a server 593 at state 594. The publication of the data at state 594 is shown by the thick broken arrow 595 in FIG. 11. Once the content and title layout have been published to the server 593 at state 594, the process ends at an end state 598.

After the content and title layout are published by the publisher 102 at state 594, the server stores the title layout and parsed content in the server COS as shown by data container 599. This data is then made available to customers of the on-line system.

As can be seen upon reference to FIG. 11, a customer 160 begins the process of retrieving content from the server 593 at a start state 601. The customer 160 opens a viewer program at a state 602 and then requests a particular title at a state 605. Once the customer has requested a particular title at state 605, a determination is made at a decision state 607 whether the requested title is in the local COS of the customer's computer.

If the requested title is in the local COS at the decision state 607, then the requested title is retrieved from the local COS at a state 609. However, if the title is not found in the local COS at decision state 607, then the title is retrieved from the server COS at a state 611. The retrieval of stored titles and parsed content from the server 593 is shown by the thick broken arrow 612. If the title is retrieved from the server COS at state 611 or from the local COS at state 609, the first page is opened in the title at a state 613. Once the first page in the title has been opened at state 613, the parsed content is displayed in the appropriate linked control region at a process state 615. Now the customer 160 can view the parsed content in the control regions of the pages in the requested title. After the customer 160 has viewed the content displayed at state 615, the process ends at an end state 620.

FIG. 11 therefore shows an overview of the process of creating content, publishing the content to a server, and having that content retrieved by a customer so that it can be viewed on a page within a title. The following section discusses how to create content in an on-line publishing system with a story editor.

A. Creating Content With a Story Editor

Figure 12:
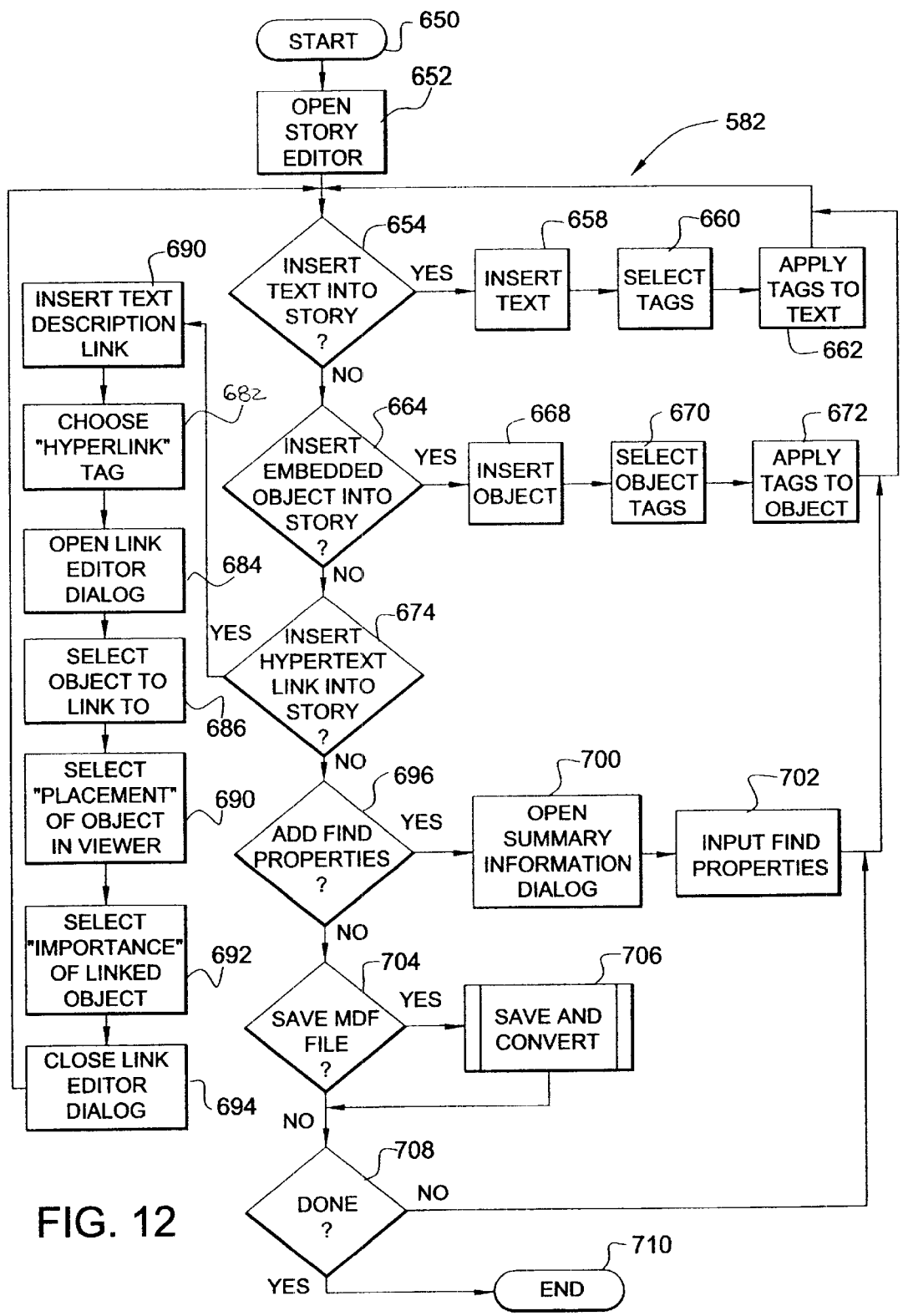
FIG. 12 is a flow diagram of the process used to create a new MDF document with a content editor as shown in FIG. 11.

FIG. 12 illustrates a more detailed view of how to create a MDF content document 582 using a story editor. As shown in FIG. 12, the process 582 begins at a start state 650 and then proceeds to a state 652 wherein the story editor is opened. As discussed above, one preferred story editor is an enhanced version of Microsoft Word®. The enhanced Word® includes styles for tagging the document appropriately to be used as content in the Multimedia Publishing system.

Once the story editor has been opened at state 652, a decision is made at a decision state 654 whether to insert text into the story. If the author decides to insert text into the story at state 654, then text is inserted at a state 658. Once the author has inserted text into the story at state 658, a tag is applied to the text at a state 660.

Tags are applied to text in a story by highlighting the text to be tagged and then selecting a style from the available styles in the style sheet. As is known, Microsoft Word contains groups of styles which can be applied to any text in the story. An example of styles which are made available to an author by the enhanced version of Microsoft Word, the preferred MPS document editor, is shown below in Table 1.

TABLE 1

Enhanced Microsoft Word ® Styles

| Style | Use |
| --- | --- |
| Abstract Body | Normal Paragraphs in the abstract. |
| Abstract Heading | Headline for the abstract. |
| Address | Typical surface mail address format. Enables easy identification and formatting of address. |
| BlockQuote | This is used to visual distinguish quotation for other sources. |
| Bold | Bold text. (Character style) |

TABLE 1-continued

Enhanced Microsoft Word ® Styles

| Style | Use |
| --- | --- |
| Citation | Similar to a BlockQuote except that it is inline. (Character style) |
| Emphasis | Emphasized text. (Character style) |
| Fixed Width | Fixed width typewriter font |
| Heading 1–Heading 6 | Headline |
| Hyperlink | Identifies text that is part of a hypertext link. (Character style) |
| Wrap:advertisement | A floating graphic style that indicates an advertisement. (Character style) |
| Wrap:custom 1 and Wrap:custom 2 | Styles applied to floating graphics that ICPs can use for any special purpose. (Character style) |
| Wrap:design feature | A floating graphic style that indicates a graphical feature that enhances the visual characteristics of the story but does not convey additional factual information. (Character style) |
| Wrap:related graphic | A floating graphic style that indicates a related graphic topic. (Character style) |
| Wrap:sidebar graphic | A floating graphic style that indicates that the graphic describes a particular topic in the story in more detail. (Character style) |
| Wrap:supporting graphic | A floating graphic style that indicates that the graphic supports the main points made in the story. (Character style) |
| Italic | Italic text. (Character style) |
| List Bullet | Unordered List |
| List Number | Numbered list. |
| Normal | Paragraph |
| Sample | Sample information. Typically information a customer might enter into a form. |
| Strikethrough | Strikethrough text |
| Strong | stronger emphasis |
| Term | Term in a definition list |
| Term Definition | Definition of a term in definition list |
| TOC | TOC entry |
| Underline | Underlined text |
| Variable Name | The name of a variable. Used for describing programming languages. |

As will be discussed below, these styles are used to convert the Microsoft Word® document into a MDF file in the format appropriate for content in the preferred multimedia publishing system. Briefly, once a style has been chosen, a control code is placed within the document indicating that a particular portion of text should marked with a given style. Upon converting the Microsoft Word document in a MDF file, each control code defining a particular style is converted into an appropriate tag for the MPML format.

Once a tag has been selected at state 660, it is applied to the text at a state 662 wherein the process 582 then loops back to decision state 654 wherein the process 582 queries whether more text is to be inserted into the story. If more text is not to be inserted into the story at decision state 654, the process 582 moves to another decision state 664 wherein the process 582 queries whether to insert embedded objects into the story at a decision state 664.

If a choice is made at decision state 664 to insert an embedded object into the story, then the object is inserted at a state 668 and a tag is selected for the object at a state 670. This type of tag may be a wrap style as shown in Table 1. A wrap style is used to indicate to a control where to position a particular object within the control region. For example, a particular wrap style may indicate to a control that the embedded object should be placed at the bottom, right corner of the control region whenever the content is rendered by the control. Other wrap styles may indicate that the embedded object should be placed in the center, left side or other geographic position in the control region.

After selecting the appropriate object tag at state 670, the tags are applied to the object at a state 672. Following application of the tags, the process 582 loops back to the decision state 654 wherein the system 582 queries whether to insert text into the story. If there is no text to be inserted into the story at decision state 654 and no embedded object to be inserted into the story at decision state 664, then the process 582 moves to a decision state 674 wherein a query is made whether to insert a hypertext link into the story.

If a decision is made at decision state 674 to insert a hypertext link into the story then text describing the link is inserted into the document at a state 680. The text describing the link at state 680 can be, for example, a name which describes the object that will be linked. If the object to be linked references George Washington, then the inserted text may be "George Washington." Once the text describing the link has been inserted at state 680 into the document a hyperlink tag is chosen at a state 682. As shown in Table 1, one of the styles available within the enhanced word style editor is hypertext link. This tag is chosen by highlighting the text inserted at state 680 and then choosing the hyperlink style from the available styles in the enhanced Word® program. Although the enhanced Word® program is one preferred style editor, other style editors which allow inserting and tagging hypertext links are within the scope of the present invention.

Once the inserted text has been tagged with a hyperlink tag at state 682, a link editor dialog is opened at a state 684 so that properties associated with the hyperlink can be modified. For example, the object to be linked to is selected at a state 686 and the "placement" of the object in the viewer is chosen at a state 690. The placement of the object selection in the link editor controls where the viewer places stories aquired by the link. For example, a "RELATED STORY" placement setting indicates that the linked item is a complete topic on par with the story currently being edited. However, a "SIDEBAR" placement setting indicates that the linked item provides more details on the current story.

After selecting placement of the object in the viewer at state 690, a selection of the "importance" of the linked object is made at a state 692. The importance option describes how to treat the linked-to objects when retrieving the story containing the link. When objects are retrieved in an unattended schedule mode, the links marked with the "Prefer Automatic Gathering" option are retrieved. The other option for the importance is "Prefer Optional Gathering". As noted, these options only indicate preferences and in many cases the viewer will ignore these settings. For example, if a number of linked stories are all marked as "Prefer Automatic Gathering", then when the first story is retrieved the viewer will only aquire the second story. Otherwise, a large number of stories could accidentally be acquired.

After the importance of the linked object has been selected at state 692, the link editor dialog is closed at a state 694 wherein the process 582 then moves back to the decision state 654 wherein the process 582 queries whether to insert text into the story. If there is no text to be inserted into the story at decision state 654 and no embedded object to be inserted at decision state 664 and no hypertext link to be embedded at decision state 674 then a decision is made at a decision state 694 whether to add find properties to the document.

If find properties are added to the document at decision sate 696, then a summary information dialog is opened at state 700 for inputting properties associated with the document. These properties are input at state 702. Find properties can include the author's name, date the document was created, keywords, and other information used to find the document in the on-line publishing system. Once find properties are inserted into the summary information dialog at state 702, the process 582 loops the decision state 654 wherein a query is a made whether to insert text into the story. The process 582 passes back through decision states 654, 664, 674 and 696 before reaching a decision state 704 wherein a decision is made whether to save the multimedia document format file into a storage.

This storage can be a hard disk, floppy disk, network server, CD ROM or other permanent storage device. If a decision is made at decision state 704 to save the MDF file, then the file is saved and converted at a process state 706. If a decision is made at decision state 704 to not save the file then the process 582 queries whether or not it is done at a decision state 708. Similarly, once the file has been saved and converted at process state 706 the process 582 queries whether it is done at decision state 708. If the process is finished at decision state 708, then it ends at an end state 710. However, if the process 582 is not finished at decision state 708 it loops back up to decision state 654 wherein it again queries whether or not to insert text into the story.

B. Saving and Converting Content

Figure 13A:
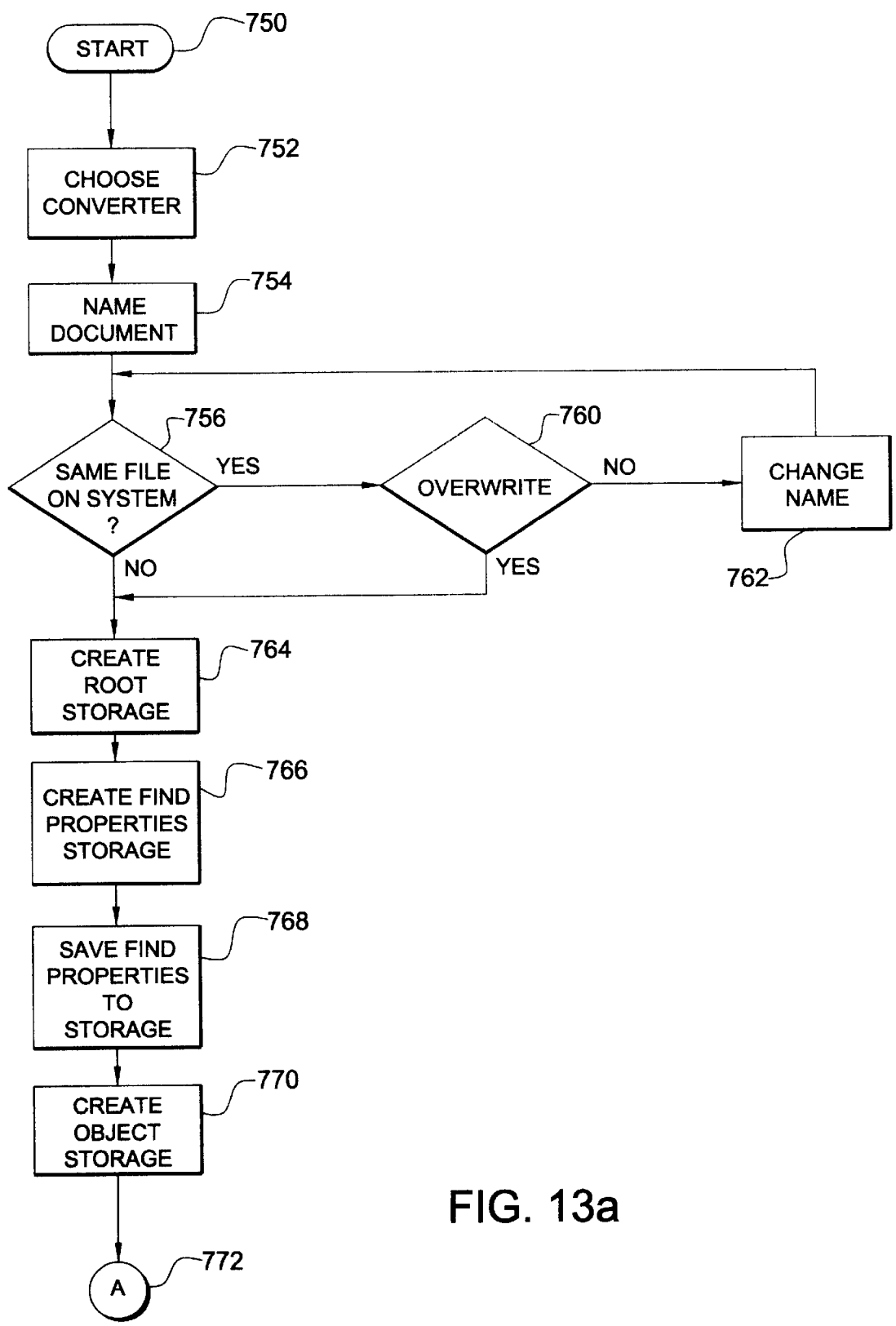
FIGS. 13a and 13b are flow diagrams of the process performed by the preferred content editor to save content in a MDF document as shown in FIG. 11.

Reference is now made to FIG. 13*a* wherein the process of saving and converting a MDF file as shown in process state 706 of FIG. 12 is described in more detail. Once the process of saving and converting has begun at a start site 750, a converter is chosen at a state 752 to convert the tagged document into a multimedia document format file. This converter changes the rich text format (RTF) that is the default document format for the enhanced Microsoft Word® program and converts the document into a MDF file. This is done by mapping styles chosen by the author into tags which can be understood by the viewer when the content document is read by a customer.

Once a MDF converter has been chosen at state 752, the document is named at a state 754. If a document with the same name is found to exist on the system at a decision state 756, then a choice is made at a decision state 760 whether or not to overwrite the file. If a choice is made at the decision state 760 not to overwrite the file then an option of changing the name of the file is given at a state 762 and the process 706 loops back to query whether a file with the new name exists on the system at the decision state 756.

If a choice is made at decision state 760 to overwrite the file, then the process 706 begins to create a root storage object at state 764. This is done through the standard IStorage interface in OLE. Once the root storage has been created at state 764, the find properties stream is created at state 766 with a standard IStream interface. After creating the find property stream at state 766, these properties are streamed at a state 768. At this point, the find property data has been saved to a find property stream below the root storage.

After the find property data has been streamed at state 768, an object storage is created at state 770. After the object storage is created, the system moves to an off-page connector 772 wherein the process continues to FIG. 13b at off-page connection 772. After off-page connector 772, a storage for the MPML tagged text is created at a state 776. Once this storage has been created, the process 706 moves to the next style tag at state 780. Once the text style tag has been found, the process queries whether it is a "head" tag at a decision state 782. If the current tag is a "head" tag at decision state 782, then the tagged text is retrieved at state 784 and converted into an MPML tag at state 786. Once the tag has been converted to an MPML type of tag at state 786, it is inserted into the "head" stream of the MPML storage at state 788.

The process 706 then moves back to retrieve the next style tag at state 780. After passing through decision state 782, the process moves to a decision state 800 which queries whether the current tag is a "body" tag. If the current tag is a body tag at decision state 800, then the tagged text is retrieved at state 802 and converted into an MPML type tag at state 804. Once the tag has been converted it is inserted into the body stream of the MPML storage at state 806. The process 706 then moves to the next style tag at state 780 wherein it passes through decision state 782 and decision state 800 to query whether the tag is an embedded object tag at a decision state 810.

If the current tag is an embedded object tag at decision state 810, then a link pointer to the object is placed in the text at state 812 using the name of the entity as a reference. The embedded object is then saved to an object storage which has a data stream and results stream. Saving an object within a storage is well known within the OLE structured storage system. Once the object has been saved into an object storage at state 814, a bitmap is saved to the results stream of the object storage at state 816.

The process 706 then moves to the next style tag at state 780. If the process moves through decision state 782, decision state 800 and decision state 810, the process 706 queries whether all of the tags have been read and the process is done at a decision state 820. If all of the tags have been read at decision state 820, then all streams and storages are closed at state 822 and the process ends at end state 824. However, if the process 706 is not finished at decision state 820, then the process 706 moves to the next style tag at state 780.

Figure 13B:
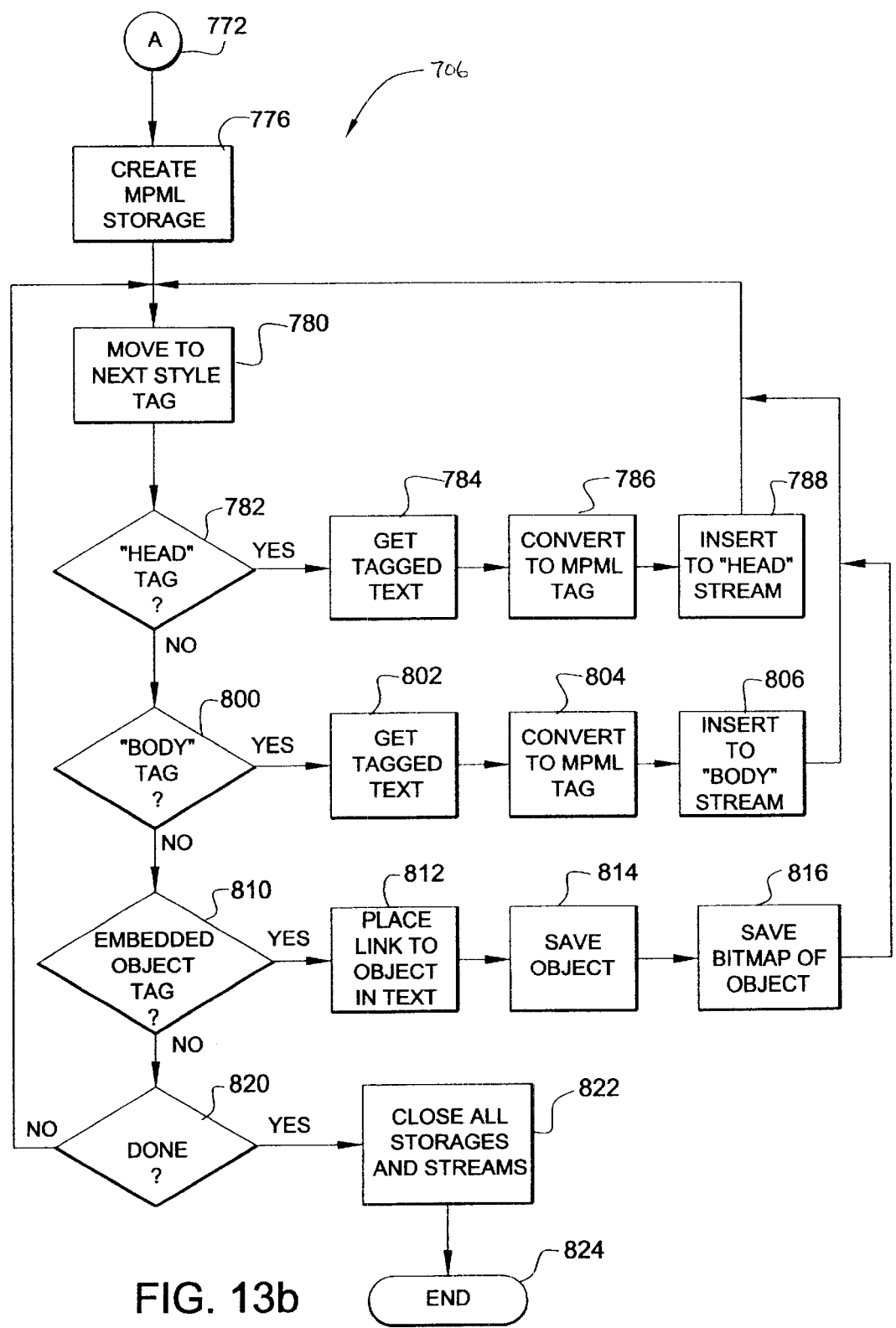

FIGS. 13a and 13b therefore show the flow of saving and converting a Microsoft Word Rich Text Format document into a multimedia document format file that can be used as content in the multimedia publishing system.

C. Adding Content to a Title

As shown in FIG. 11, once a MDF file is linked to a title, it is parsed into a parse tree so that it can be transmitted more efficiently over a low bandwidth line. This parsing process is discussed in more detail below.

The purpose of the MP system parser is to load tagged content to an MDF file and translate it into a data structure that can be used by controls in the MP system. This is accomplished by reading the MDF file and interpreting tags and their attributes that are applied to the content within that file. The result of the parsing process is a file having a tree structure wherein each tagged element in the file becomes a node in the tree.

During the compose process, MP system controls "walk" the parse tree to extract elements and map their tags to style definitions in linked style sheets. A style sheet is linked to a particular control so that the result of tagging is a styled piece of content. The process of tagging documents and using style sheets is discussed below in more detail. Two objects make up the MP system parser and work together to create the parse tree.

The first object is a low-level SGML parser which is a recursive decent parser which reads tagged content and generates events. These events are points encountered in parsing where a second higher level object can understand the tag and apply the proper formatting. In this system, the low level parser contains no actual knowledge of the descriptors used to tag the text. Pseudo-code for a low level parser is shown below.

The low-level parser is basically a state machine. It looks at each character in the input text and modifies its current state depending on the identity of the next character. As states change, "events" are returned to a high-level Document Type Descriptor (DTD) manager which interprets and acts on the event. Examples of events: start tag encountered, end tag encountered or attribute encountered. The following table describes the states and the inputs that cause changes in state and events. Input characters not listed for each state have no effect on the current state and cause no events to be generated to the high-level parser.

| Current State | If next char is: | New state: | Event passed up: |
| --- | --- | --- | --- |
| In_Start_Tag | ! | In_Doctype | |
| | any alpha-numeric | In_Start_Tag | |
| | > | if tag is NOT empty tag (In_Text_Run) else (In_Empty_Tag) | Start_Element |
| | whitespace | In_Whitespace | Start_Element |
| | / | In_End_Tag | |
| In_Doctype | > | In_Text_Run | |
| In_Text_Run | < | In_Start_Tag | |
| In_Tag_White | any alpha-numeric | In_Attribute | Start_Attributes |
| | / | if tag is NOT empty tag (In_Text_Run) else (In_Empty_Tag) | |
| In_Attribute | = | In_Attribute_Val | |
| | > | if tag is NOT empty tag (In_Text_Run) else (In_Empty_Tag) | End_Attributes |
| | whitespace | In_Attr_White | Process_Attribute |
| In_Attribute_Val | > | if tag is NOT empty tag (In_Text_Run) else (In_Empty_Tag) | End_Attributes |
| | whitespace | In_Attr_White | Process_Attribute |
| | ' | In_Single_Quote | |
| | " | In_Dbl_Quote | |
| In_Single_Quote | ' | In_Attr_White | Process_Attribute |
| In_DblQuote | " | In_Attr_White | Process_Attribute |
| In_Attr_White | any | In_Attribute | |

-continued

| Current State | If next char is: | New state: | Event passed up: |
|---|---|---|---|
| | alpha-numeric | | |
| | > | if tag is NOT empty tag (In_Text_Run) else (In_Empty_Tag) | End_Attributes |
| In_End_tag | > | In_Text_Run | End_Element |
| In_Empty_Tag | any character | In_Text_Run | End_Element |
| In any state . . . | End of file | — | End_Document |

The following pseudo-code is used for the above low-level parser.

Parse()
  current_state=in_text_run
  event=None
  While event=None
    Get next character
    switch(current_state)//i.e., use current_state to index table
      lookup next-state in table
      event=lookup event in table
  End
  Return event The high level object parser, called the document type descriptor (DTD) manager understands the descriptions of tags in the text. It responds to events generated by the low-level parser and actually creates the parse tree. The high-level object also provides information to the low-level parser about tags defined by the DTD manager. For example, it provides information such as which tags are empty, which tags are minimized and which tags imply a paragraph break. In this system, the DTD manager which tracks styles and tags is pluggable in that new DTDs can be created to understand other tagging schemes. For example, a DTD manager which reads HTML formatted documents could be substituted for a DTD manager which reads MPML documents.

Figure 14:
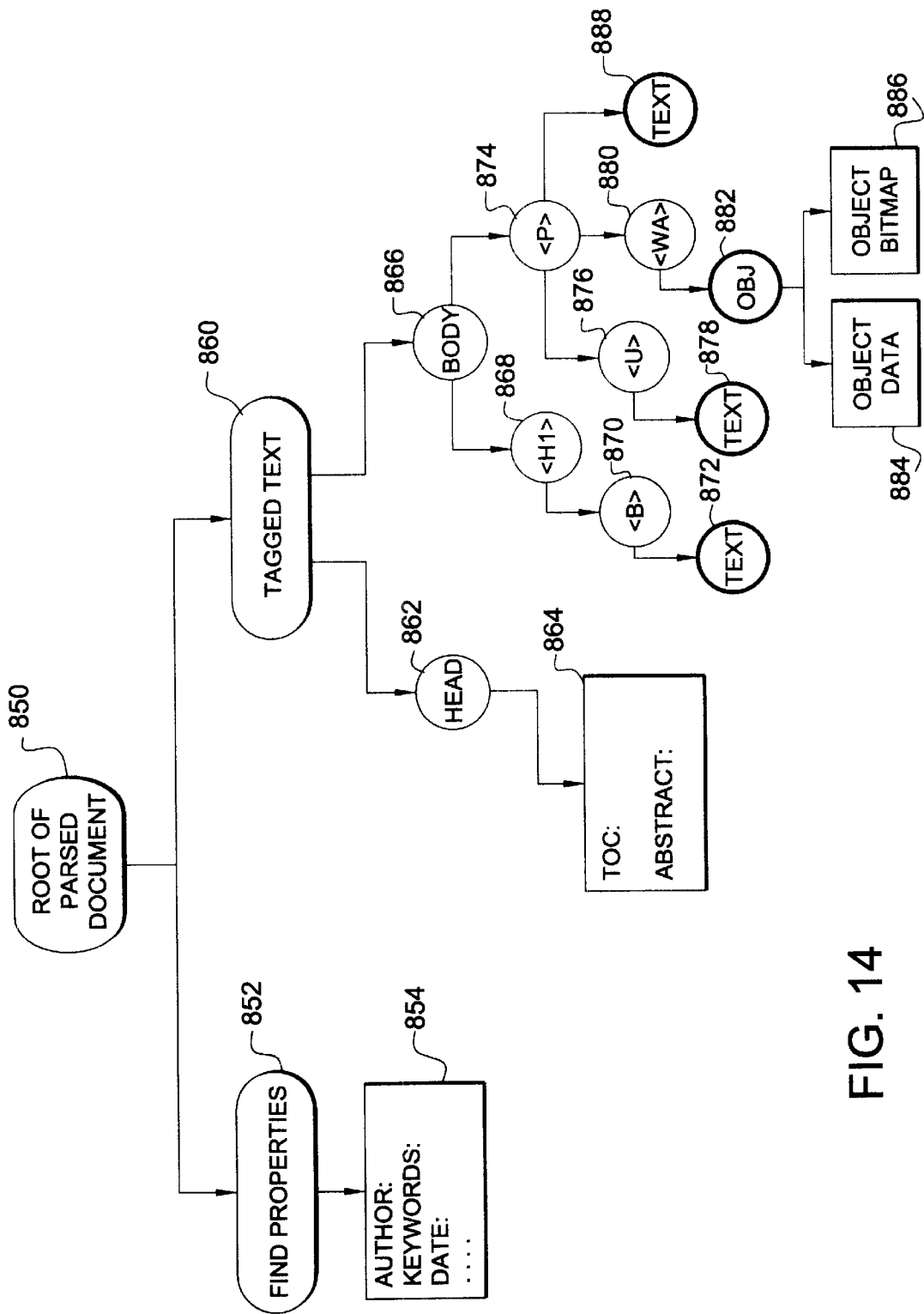
FIG. 14 is a diagram illustrating an exemplary Multimedia Publishing Markup Language (MPML) parse tree having a root, find properties and tagged text.

The results of parsing a MDF file is shown in FIG. 14. The parse tree is a data structure representing the document and created by the designer when content is linked to a title. This is done in conjunction with the low-level parser and DTD manager. For each tagged element in the parsed MDF file there exists a node identifying the tag and attributes whose data is the element that was tagged. In the MPML format, tags may be nested within each other. As a result, a node in the tree may point to other nodes representing the nested tags or to a node which contains the actual tagged text. This implies that only the "leaf" nodes of the parse tree actually point to tagged text.

D. Viewing Parsed Content

Referring now to FIG. 14, the root 850 of a parsed document is illustrated having a find properties storage 852 which contains a stream of data 854 corresponding to find property data. As explained above, this data can be the author, date the file was created, or keywords associated with this document. Also contained under the root object 850 is the tagged text 860 which has been parsed into a parse tree. As shown, the tagged text 860 has a storage 862 corresponding to the "head" data which can be found in the stream 864. The data stream 864 holds data corresponding to the table of contents, abstract, and other portions of the MPML tagged text which are not part of the main body of the document.

Also seen below the storage 860 of the tagged text is a body storage 866 which is the top node of a parse tree holding the parsed, tagged text of the body of the MPML document. As shown, the body storage 866 has a <H1> node 868. Below the node 868 is a <B> node 870 which has a text stream 872 containing text that has been tagged with the styles of node 870 and 868. Similarly, the body storage 866 has a node 874 holding a <P> tag. Below this node in the tree is a node 876 which holds <U> tag indicating that the text below it should be underlined. Below the node 866 on the tree is a stream of text 878 which is formatted as tagged by the node 876 and the node 874.

Also below the node 874 is a node 880 with a tag <WA> indicating a wrap advertisement style for an embedded object. As shown an object 882 is placed in a leaf node below node 880. The object 882 contains object data 884 and an object bitmap 886 as is standard in the OLE structured storage system. Also found below the node 874 is a text stream 888 which holds text formatted in the <P> style. Thus, FIG. 14 illustrates the structure of a parsed document after it has been linked to a title by a publisher.

Figure 15:
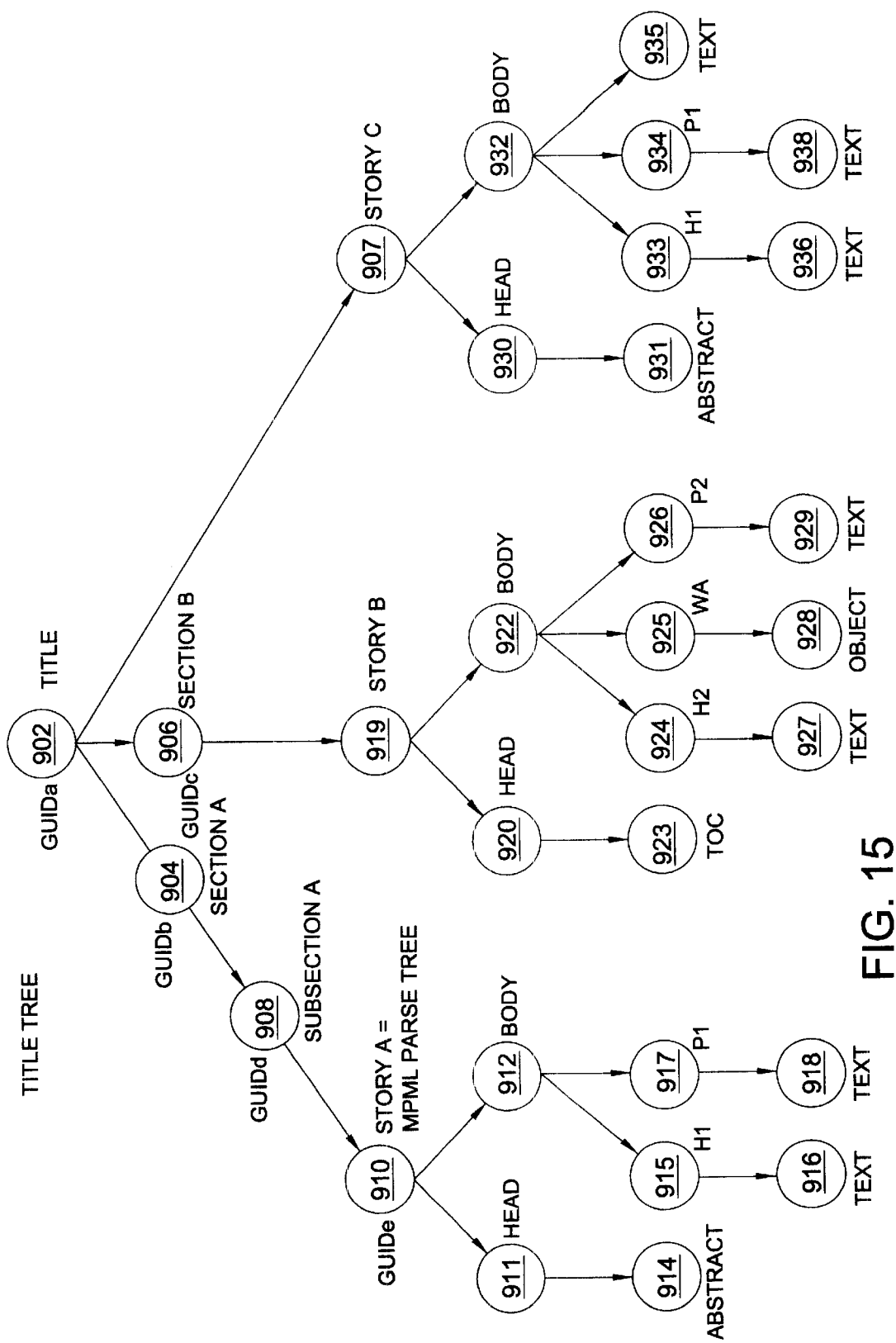
FIG. 15 is a diagram illustrating an exemplary title tree with parsed MDF documents attached to the story nodes.

Referring to FIG. 15, an exemplary title tree 900, will now be described. This title tree 900 includes exemplary MPML parse trees and also shows how the tree may not be symmetrical.

The title tree starts with a title root 902 having a GUIDa. Below the title root 902 are a section A represented by a node 904 having a GUIDb and a section B represented by a node 906 having a GUIDc. Typically, a title is arranged with sections, and some of the sections may have subsections. Stories are inserted into either of the sections or subsections. However, stories may also be placed directly below the title root in the title tree, as exemplified by story C represented by a node 907 having GUIDg. Section 904 has a subsection represented by a node 908 having a GUIDd.

Below subsection 908 is a story A represented by a root 910 having a GUIDe. As shown in FIG. 15, the root 910 of story A is the root of a MPML parse tree. Below the root 910 of story A are a head node 911 and a body node 912. The head node 911 has a leaf node 914 that, in this example, is the abstract section of the story A at root 910. The body node 912 has a Heading1 <H1> type of style represented by a node 915. Below the heading style is a leaf node 916 having text content for the story. The text content is in the form of a data stream. When instantiated by the Viewer 202 (FIG. 2), the style above it in the tree, style Heading1, will be applied to the content.

Also below body 912 is a Paragraph1 <P1> style represented by a node 917. The Paragraph1 style has a leaf node 918 below it that is also a data stream of text.

Below the section B node 906 is a story B represented by a root 919 having a GUIDf. Below the story root 919 is another MPML parse tree having a head node 920 and a body node 922. The head node 920 has a table of contents (TOC) leaf node 923. The body node 922 has a Heading2 <H2> style node 924, a Wrap Advertising <WA> style node 925 and a Paragraph2 <P2> style node 926. The Heading2 style node 924 has a leaf node 927 representing a text content stream. Below the Wrap Advertising style node 925 is a leaf node 928 representing an embedded object stream. The embedded object is preferably an OLE object. The Paragraph2 style node 926 has a leaf node 929 for a text stream.

As previously mentioned, story C represented by root 907 is immediately beneath the title root 902. Below the story root 907 is a MPML parse tree having a head node 930. Beneath the head node 930 is a leaf node 931 having an abstract of the story 907. Also beneath the root 907 is a body node 932 having a Heading1 <H1> style node 933, a Paragraph1 <P1> style node 934 and a text stream leaf node 935. Further, beneath the Heading1 style node 933 is a text stream leaf node 936. The Paragraph1 style node 934 further has a text leaf node 938 below it. As previously mentioned, all leaf nodes are streams that contain data to be formatted in the styles set by its parental nodes in the parse tree. All nodes above the leaf node level of the title tree are storages.

E. Viewing a Tagged Document

Figure 16:
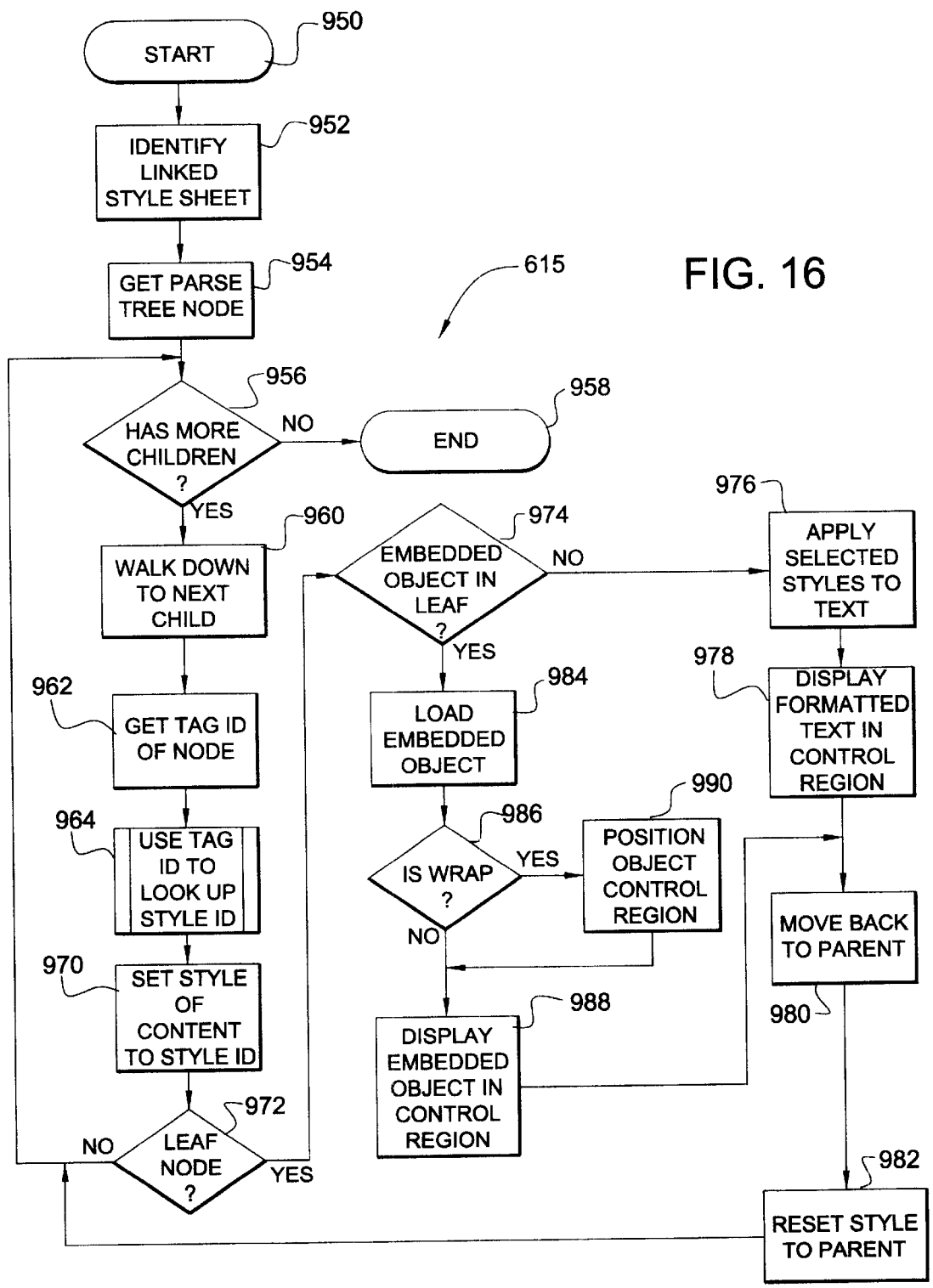
FIG. 16 is a flow diagram illustrating the process of viewing tagged content in a control region of a page as shown in process 615 or FIG. 11.

Referring now to FIG. 16, a process 615 as was illustrated in FIG. 11 for reading a parse tree and formatting the parsed content into a control is shown. The process 615 begins at a start state 950 after a customer 160 opens a page and a control begins executing its commands. In the control, a linked style sheet is identified at a state 952. Each control on every page in the MP system is linked to a style sheet GUID which directs the control to their linked style sheet using the IStyleSheet OLE interface. After finding the linked style sheet, the control requests a MPML parse tree corresponding to the content to be rendered from the viewer (state 954).

Once the control has requested the first node of the MPML parse tree of the content at the state 954, the process 615 moves to inquire whether or not there are child nodes hanging off the parse tree node at a decision state 956. If no child nodes are found off the parse tree node requested at state 954, the process 615 ends at an end state 958. However, if there are children of the parse tree node as determined at decision state 956 then the process walks to the next child at a state 960. A schematic view of a MPML parse tree and its associated nodes is shown in FIG. 14.

Once the process 615 has moved down to the next child in the tree at state 960 the tag ID number of the node is requested at state 962. A tag ID number is generated when the content (normally a MDF file) is linked to a control by the designer. Each tag, for example, <H1>, is converted to a numerical description during the link to save space in the stored parsed content. Therefore, at the state 962, the tag ID of the node is a number corresponding to a particular tag.

Once the tag ID number for the current node has been retrieved, the process 615 retrieves a style ID number from a tag ID lookup table stored in the VIEWDLL.DLL at a process state 964. A style ID number is a number which is associated with a particular style object. For example, style ID number 6 may correspond to the HEADING 1 paragraph style object in the linked style sheet. Once a style ID number for the current node has been ascertained, a pointer is set at a state 970 so that any text or OLE object residing below the current node on the parse tree will be formatted with the retrieved style.

After a pointer has been set to the current style ID number at state 970, the determination is made at decision state 972 whether the current node is a leaf node or not. A leaf node is the lowest node on a branch of the parse tree. As can be seen with reference to FIGS. 14 and 15, the leaf nodes contain either text or embedded objects. The text or embedded objects in the leaf nodes are formatted into the control region in the styles that are set by the leaf node's parental nodes. Thus, if a particular text leaf node in the parse tree is below a tag corresponding to a bold character style, the text in that leaf node will appear as bolded in the control region.

If the current node is not a leaf node at decision state 972 the process 615 loops up to question whether more children of the node exist at decision state 956. If the current node is a leaf node at decision state 972, the process 615 queries at decision state 974 whether the current leaf node contains an embedded object. Preferably, the embedded object is an OLE object, however other embedded objects known in the art are within the scope of the present invention.

If the leaf node does not contain an embedded object at decision state 974, then the styles that have been set at state 970 are applied to the current text at a state 976. After the selected styles have been applied to the text at state 976, the formatted text is then inserted into the control region and displayed by the control at a state 978. It should be observed that an assumption is made that non-text objects are not embedded within text objects. However, the present invention is generalized to operate with any manner of embedding.

Now that a styled portion of the content has been placed into the control region on a page, the system needs to discover whether any more nodes exist which may have additional text or embedded objects to be formatted and displayed within the control region. For this reason, the system begins a recursive procedure to move through the entire parse tree (although an iterative solution is diagrammed). After displaying formatted text in the control region at state 978, the process 615 moves back to the parent of the current node at state 980 and resets the style to the parent style ID number at state 982. Once the style has been set to the style ID number of the parent node, the process 615 loops to state 956 where it queries whether more unread children exist in the parse tree. If no more unread child nodes exist in the tree at decision state 956, the process 615 ends at the end state 958. If more children do exist, the process 615 walks to the next unread child node at state 960 and continues as discussed above.

Because text styles do not apply to embedded objects such as graphic images, a special subroutine handles displaying these objects in the control. Once the system determines that an embedded object resides in the leaf node at decision state 974, that object is loaded into the system memory at state 984 using LoadOleObject and InsertOleObject. Once the embedded object, such as an OLE object, has been loaded into the system at state 984, the process 615 checks at a decision state 986 whether a wrap style had been set for the object at state 970. If the set style was not a wrap style at decision state 986, the process 615 moves directly to display the embedded object in the control region at a state 990. In this case, the embedded object is displayed in the control region at the same point in the text when it was originally authored.

However, if a decision is made at decision state 986 that the embedded object did have a wrap style set at state 970, the process 615 positions the object to the correct place in the control region at a state 990. The position that the embedded object takes within the control region at state 990 is determined by referencing the style that was set at state 970 to the linked style sheet. For example, if the set style was "wrap-advertisement", and upon referencing the style sheet the control determined that this style means to place the embedded object in the upper, right corner of the control region, the object will therefore be appropriately placed at state 990.

Figure 17:
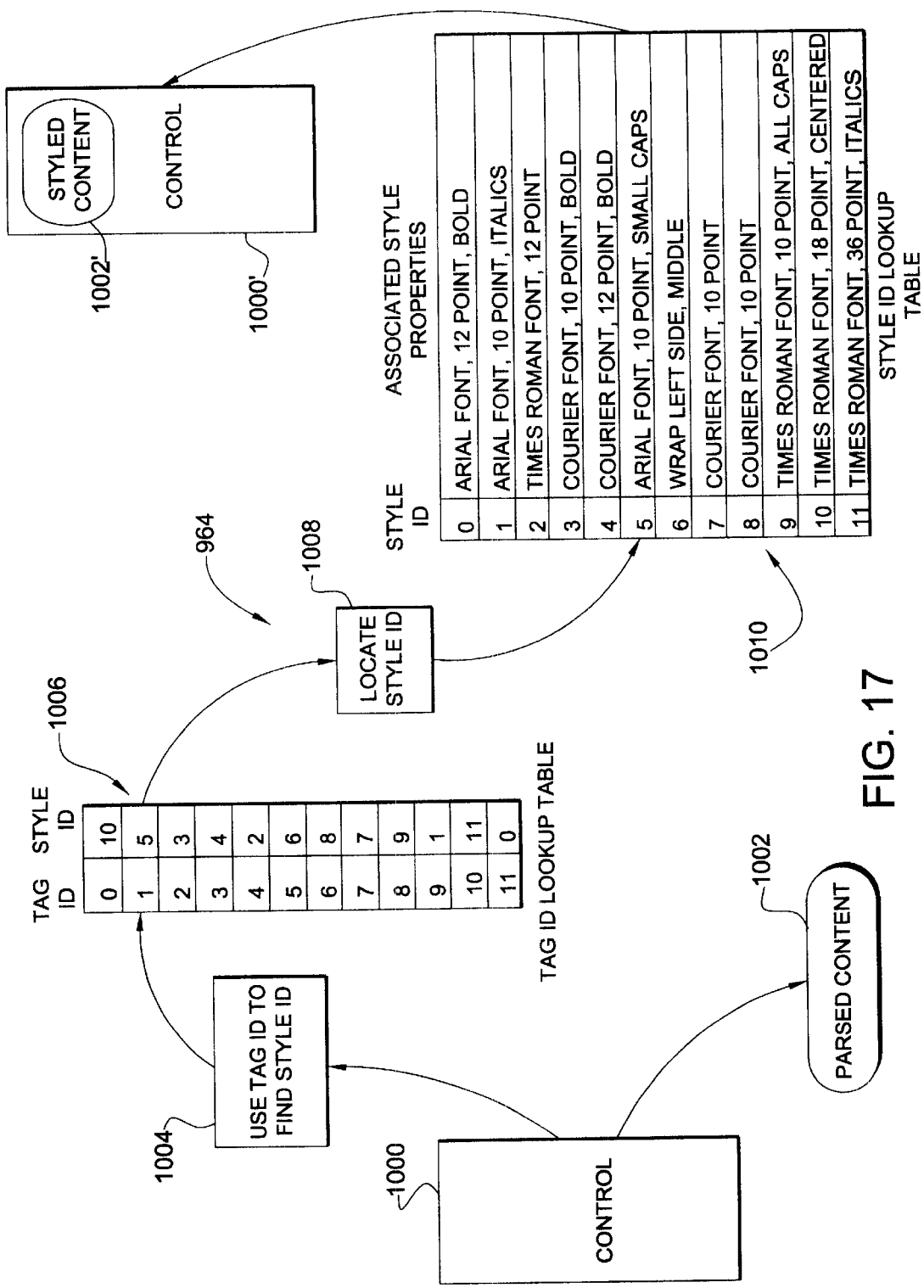
FIG. 17 is a diagram of the process of mapping tag ID numbers to style ID numbers for retrieving style properties from a style ID lookup table.

Once the object has been positioned at the correct place in the control region at state 990, the process 615 displays the embedded object within the control region at state 988 and continues as discussed above. FIG. 17 illustrates a more detailed view of the process of using tag ID numbers to lookup style IDs as shown in state 964 of FIG. 16.

F. Mapping Tag ID Numbers to Style Properties

As shown in examplary FIG. 17, control 1000 uses a process 964 to match tag ID numbers to their corresponding style ID numbers and thereafter their associated properties. The control 1000 requests tag ID information from a parse tree 1002. The control 1000 then uses the returned tag ID number to find a corresponding style ID number at a state 1004. In FIG. 17, the control has found tag ID number 1 in the parsed content 1002. The control 1000 goes to a tag ID Lookup Table 1006 to find the style ID number which corresponds to the retrieve tag ID. In this example, tag ID number 1 corresponds to a style ID number 5.

Once a style ID has been determined for a particular tag ID number, the process 964 locates the returned style ID number in a style ID lookup table 1010 at a state 1008. The style ID look-up table 1010 is used to associate particular style ID numbers with their appropriate style properties. The associated style properties of style ID number 5 in this example are arial font, 10 point, in small caps. These associated properties are then applied to the returned text from the parsed content 1002 to display styled content 1002' in a control 1000'.

The following Pseudo-code describes the process that the MP system uses for mapping tags to styles and applying styles to text. Note that this process occurs during the compose operation when the control instructs the viewer to begin composing content. Presently, the named interfaces are stored in the BBCTL.OCX library in the MP system. While the following pseudo-code is one method of retrieving content into a control, one of ordinary skill in the art will realize that other similar methods could also accomplish the same function.

```
Compose ( )
{
    while more to compose
        Get parse tree from viewer
        Compose sub-tree
        if done composing, exit while
    Tell viewer where compose stopped
}
ComposeElement
{
    for each child remaining in the tree
        if leaf node
            ComposeLeaf of this node
        else
            PreElement
            ComposeElement (node)
            PostElement
}
PreElement
{
    tag id = Get tag id of this node
    style id = Viewer map tag id to style id.
    Setstyle(style id)   // all subsequent InsertText will
                         // use this style
}
PostElement
{
    Get parent node of this node
    tag id = Get tag id of parent node
    style id = Viewer map tag id to style id
    Setstyle(style id)   // set style back to parent style
                         // (InsertText uses this one now)
}
InsertText
{
    ApplyStyle
    insert text into text engine
}
ComposeLeaf
```

```
{
    if embedded object
        insert object into control
    else
        InsertText
}
Setstyle(style id)
{
    Query style sheet for style object with given style ID
    if paragraph style
        set current paragraph style to style ID
    else
        set current character style to style ID
}
ApplyStyle
{
    for each attribute in current character style
        if last character style value is different
            set value defined by current character style
    last character style = current character style
    for each attribute in current paragraph style
        if last paragraph style value is different
            set value defined by current paragraph style
    last paragraph style = current paragraph style
}
```

Figure 18:
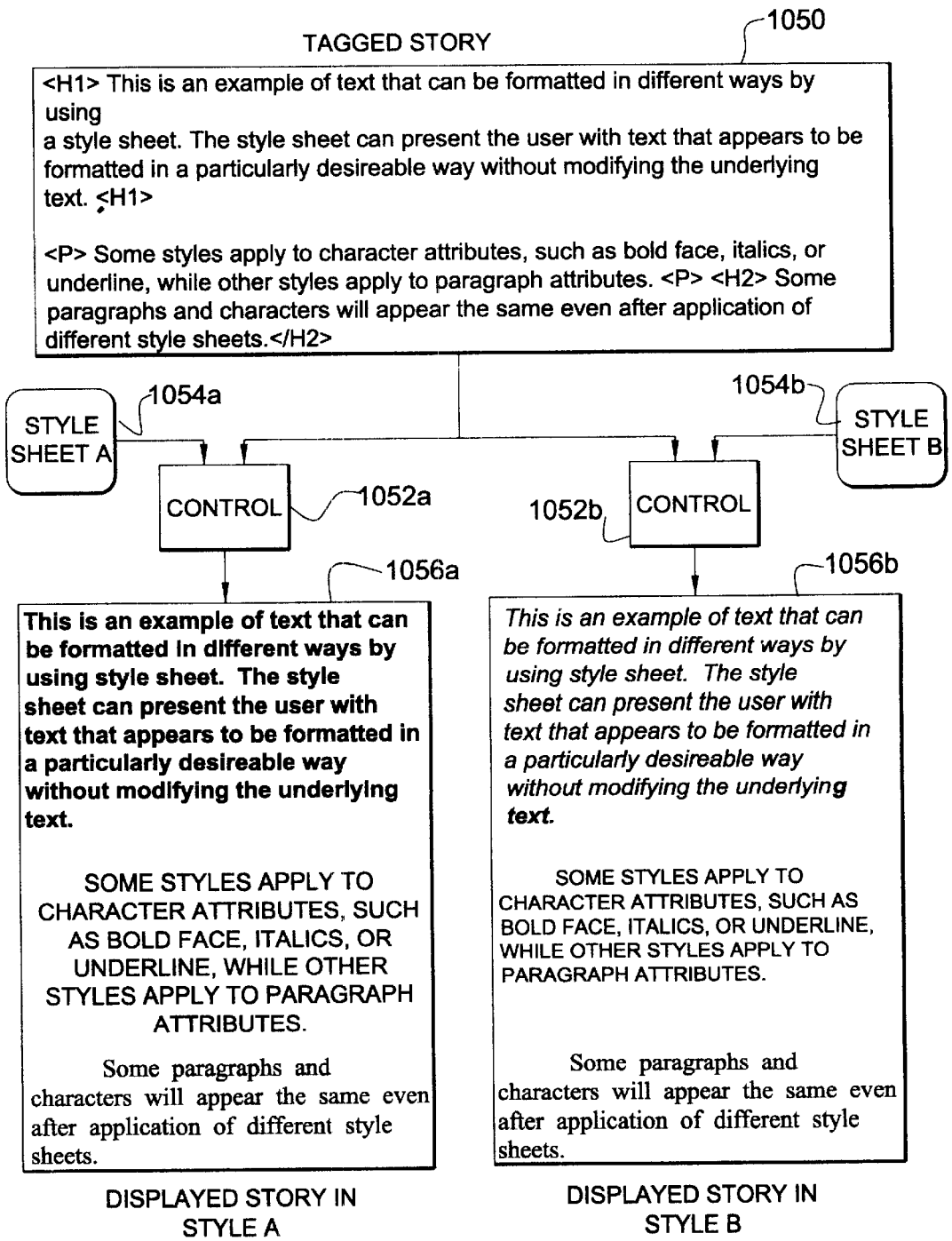
FIG. 18 is a block diagram illustrating the process of displaying the same tagged story using two different style sheets.

Referring now to FIG. 18, a tagged story 1050 is placed in two controls 1052a and 1052b on a page in a MPS title. As shown, the tagged story 1050 contains bracketed indices of a particular style. For example, the <H1> tag indicates that this is a HEADING1 style of text. Similarly the <P> tag of the second paragraph indicates that this is a Paragraph 1 style of text.

As shown, the tagged story 1050 is pulled into the control 1052a which has an associated style sheet 1054a. Similarly, the tagged story is also brought into control 1052b which has an associated style sheet 1054b. Now referring to the displayed story 1056a it can be seen that this story is displayed in a style which is different than the displayed story 1056b. For example, the displayed story 1056a has a first paragraph that is bold faced, a second paragraph that is centered in all caps and a third paragraph that is Courier style with the first line indented.

In comparison, the displayed story 1056b has a first paragraph that is italicized, a second paragraph that is indented in small caps and a third paragraph which matches the third paragraph of displayed story 1056a which is indented at the first line and in a Courier font. FIG. 18 shows that the same tagged story can be displayed in two different manners on two different controls by association of different style sheets. When the viewer displays the story using style sheet A, the text is formatted as shown in displayed story 1056a. when the viewer displays the story using style sheet B, the story appears as displayed in 1056b. Although the tagged story 1050 is never reformatted, it gets displayed differently through the use of style sheets.

Although the previous discussions have concentrated on style properties of text material, it is also possible to tag graphical content with certain style properties in the MP system. As was discussed previously, the wrap styles are used by a designer to tag graphical images with styles corresponding to their geographic position within a control.

VII. SUMMARY

This section summarizes benefits provided by the present invention. In the MP system, a content provider has a lot of flexibility to choose how a customer will view a story. In addition, the MP system is device independent in that the tagged content can be displayed with high quality on many different devices. For example, a content provider can create a title just once, but the title can be viewed on a VGA screen with one column, a printer with many columns, a small screen personal digital assistant (PDA), an interactive television (ITV) system, a fax machine, or a notebook computer. Different styles can be applied to each of these devices so that the displayed content is formatted appropriately.

Moreover, separating the content and design in the MP system enables sending or distributing stylized high-quality publications over low-speed communications links. This results from the fact that the design and style sheets of many titles remains fairly static while only the content changes regularly. The MP system does not need to send large design descriptions and style sheets to customers' computers unless the designs or styles change. Content can typically be transmitted quickly since it consists of tagged components, not the actual pages and controls themselves. Thus the separation of design and content eliminates much of the communication overhead in an electronic publishing environment.

Further, the MP system supports standards such as Microsoft Word and Standard Generalized Markup Language (SGML) to ensure that the content provider's investment in existing tools can be fully leveraged. The MP system also reads standard HyperText Markup Language (HTML) documents so that existing HTML documents can be easily converted to more sophisticated applications. Additionally, through support of the OLE standard, tools that supports OLE server capabilities can be used to create content embedded in an MPS title. By supporting additional standard file formats, the MPS can also accommodate other tools (for example high-end graphic applications).

In addition to the advantages listed above, the MP system also has other advantages that differentiate this system from other on-line publishing systems. For example, graphic designers can work on the title and page layouts, while authors create content objects. There is a clean separation of responsibilities, with separate tools used by each professional.

Also, new content does not need to be laid out by a designer before it can be published. It can be uploaded to the distribution point and downloaded to customers' machines as soon as the object is completed, since the rendering is automatically done on the consumers' machines based upon the designs in the title's page layouts. Also, since no rendering has been done prior to downloading the title and objects to the consumer's machine, the appearance of a new piece of content does not force the system to re-download any other items.

As stated above, the styles contained in every style sheet are predefined by the MP system authoring program. In a presently preferred embodiment, this program is a version of the Microsoft Word® program, termed MPS Word, that has the special capability of producing documents formatted in a Multimedia Document Format that was described in detail in reference to FIG. 10. A part of the MDF is a new markup language known as MPML which is a form of an SGML. However, MPML has formatting commands unique to the MP system. Markup languages which are well known in on-line networks identify portions of documents by embedded tags. In an MPML document, there is one MPML tag per document portion and each tag is mapped to a style that is found in a style sheet.

Although the invention has been described with reference to specific embodiments, the description is intended to be illustrative of the invention and is not intended to be limiting. Various modifications and applications may occur to those skilled in the art without departing from the true spirit of the invention as defined in the appended claims.

We claim:

1. A method for converting a tagged document into a multimedia document file, the method comprising steps of:

creating a root storage object for the multimedia document file;

creating an object storage hierarchically below the root storage object;

creating a storage for MPML tagged text hierarchically below the root storage object;

reading a next style tag within the multimedia document file; and when the next style tag is an embedded object tag, placing a link pointer to the embedded object corresponding to the embedded object tag in the storage for the MPML tagged text, saving the embedded object to an embedded object storage, the embedded object storage having a data stream and a results stream, and saving a bitmap corresponding to the embedded object in the results stream of the embedded object storage.

2. The method according to claim 1, further comprising steps of:

when the next style tag is a head tag, retrieving tagged text corresponding to the head tag, converting the tagged text corresponding to the head tag into an MPML tag and storing the converted tagged text corresponding to the head tag in the storage for the MPML tagged text; and when the next style tag is a body tag, retrieving tagged text corresponding to the body tag, converting the tagged text corresponding to the body tag into an MPML tag and storing the converted tagged text corresponding to the body tag in the storage for the MPML tagged text.

3. The method according to claim 2, repeatedly performing the steps of:

reading the next style tag within the multimedia document file, when the next style tag is an embedded object tag, placing a link pointer to the embedded object corresponding to the embedded object tag, saving the embedded object to an object storage having a data stream and a results stream, and saving a bitmap corresponding to the embedded object in the results stream of the object storage, when the next style tag is a head tag, retrieving tagged text corresponding to the head tag, converting the tagged text corresponding to the head tag into an MPML tag and storing the converted tagged text corresponding to the head tag in the storage for the MPML tagged text, and when the next style tag is a body tag, retrieving tagged text corresponding to the body tag, converting the tagged text corresponding to the body tag into an MPML tag and storing the converted tagged text corresponding to the body tag in the storage for the MPML tagged text, until all tags in the multimedia document file have been read.

4. The method according to claim 1, wherein the link pointer uses a name associated with the embedded object as a reference.

5. The method according to claim 1, further comprising a step of creating a find properties storage object for the multimedia document file hierarchically below the root storage object.

6. The method according to claim 5, wherein the step of creating a find properties storage object for the multimedia document file hierarchically below the root storage object includes a step of storing find properties associated with the multimedia document file in the find properties storage object.

7. The method according to claim 1, wherein the multimedia document file includes text formatted in a rich text format.

8. A computer-readable medium having computer-executable instructions for converting a tagged document into a multimedia document file, comprising steps of:

creating a root storage object for the multimedia document file;

creating an object storage hierarchically below the root storage object;

creating a storage for MPML tagged text hierarchically below the root storage object;

reading a next style tag within the multimedia document file; and when the next style tag is an embedded object tag, placing a link pointer to the embedded object corresponding to the embedded object tag in the storage for the MPML tagged text, saving the embedded object to an embedded object storage, the embedded object storage having a data stream and a results stream, and saving a bitmap corresponding to the embedded object in the results stream of the embedded object storage.

9. The computer-readable medium according to claim 8, further comprising steps of:

when the next style tag is a head tag, retrieving tagged text corresponding to the head tag, converting the tagged text corresponding to the head tag into an MPML tag and storing the converted tagged text corresponding to the head tag in the storage for the MPML tagged text; and when the next style tag is a body tag, retrieving tagged text corresponding to the body tag, converting the tagged text corresponding to the body tag into an MPML tag and storing the converted tagged text corresponding to the body tag in the storage for the MPML tagged text.

10. The computer-readable medium according to claim 9, repeatedly performing the steps of:

reading the next style tag within the multimedia document file, when the next style tag is an embedded object tag, placing a link pointer to the embedded object corresponding to the embedded object tag, saving the embedded object to an object storage having a data stream and a results stream, and saving a bitmap corresponding to the embedded object in the results stream of the object storage, when the next style tag is a head tag, retrieving tagged text corresponding to the head tag, converting the tagged text corresponding to the head tag into an MPML tag and storing the converted tagged text corresponding to the head tag in the storage for the MPML tagged text, and when the next style tag is a body tag, retrieving tagged text corresponding to the body tag, converting the tagged text corresponding to the body tag into an MPML tag and storing the converted tagged text corresponding to the body tag in the storage for the MPML tagged text, until all tags in the multimedia document file have been read.

11. The computer-readable medium according to claim 8, wherein the link pointer uses a name associated with the embedded object as a reference.

12. The computer-readable according to claim 8, further comprising a step of creating a find properties storage object for the multimedia document file hierarchically below the root storage object.

13. The computer-readable medium according to claim 12, wherein the step of creating a find properties storage object for the multimedia document file hierarchically below the root storage object includes a step of storing find properties associated with the multimedia document file in the find properties storage object.

14. The computer-readable medium according to claim 8, wherein the multimedia document file includes text formatted in a rich text format.

15. A parse tree for a multimedia document file, comprising:

a root storage; and a tagged text storage located hierarchically below the root storage, the tagged text storage including an embedded object storage.

16. The parse tree according to claim 15, further comprising a find property storage located hierarchically below the root storage, the find property storage including find properties associated with the multimedia document file.

17. The parse tree according to claim 15, further comprising a body storage located hierarchically below the tagged text storage, the body storage including the embedded object storage.

18. The parse tree according to claim 15, wherein the embedded object storage includes at least one of object data and an object bitmap.

19. A computer-readable medium having stored thereon a data structure, comprising:

a first data field containing a root storage object for a multimedia document file;

a second data field containing an object storage hierarchically below the root storage object; and a third data field containing a storage for MPML tagged text hierarchically below the root storage object, the MPML tagged text including an embedded object.

20. The computer-readable medium according to claim 19, wherein the MPML tagged further includes a link pointer to the embedded object, and wherein the embedded object includes a data stream and a results stream, the results stream including a bitmap corresponding to the embedded object.

21. The computer-readable medium according to claim 19, wherein the MPML tagged text further includes a head tag.

22. The computer-readable medium according to claim 19, wherein the MPML tagged text further includes a body tag.

23. The computer-readable medium according to claim 19, wherein the data structure further comprises a fourth data field containing a find properties storage object for the multimedia document file hierarchically below the root storage object.

24. A method for rendering a content of a multimedia document file, the method comprising steps of:

identifying a linked style sheet associated with the multimedia document file;

requesting an MPML parse tree corresponding to the content of the multimedia document file;

determining whether a child node hangs off of the parse tree;

determining whether the child node is a leaf node when a child node hangs off of the parse tree;

determining whether the leaf node contains an embedded object when the child node is a leaf node;

loading the embedded object into a control region of a display space; and displaying the embedded object in the control region of the display space.

25. The method according to claim 24, wherein the embedded object is an OLE object.

26. The method according to claim 24, wherein the step of loading the embedded object in the control region of a display space includes a step of using LoadOleObject and InsertOleObject commands.

27. A computer-readable medium having computer-executable instructions for rendering a content of a multimedia document file, comprising steps of:

identifying a linked style sheet associated with the multimedia document file;

requesting an MPML parse tree corresponding to the content of the multimedia document file;

determining whether a child node hangs off of the parse tree;

determining whether the child node is a leaf node when a child node hangs off of the parse tree;

determining whether the leaf node contains an embedded object when the child node is a leaf node;

loading the embedded object into a control region of a display space; and displaying the embedded object in the control region of the display space.

28. The computer-readable medium according to claim 27, wherein the embedded object is an OLE object.

29. The computer-readable medium according to claim 27, wherein the step of loading the embedded object in the control region of a display space includes a step of using LoadOleObject and InsertOleObject commands.

* * * * *